United States Patent [19]
Hibino et al.

[11] Patent Number: 5,829,853
[45] Date of Patent: Nov. 3, 1998

[54] FILM IMAGE SIGNAL OUTPUTTING APPARATUS

[75] Inventors: Hideo Hibino, Kawasaki; Kazuyuki Kazami; Norikazu Yokonuma, both of Tokyo; Hisashi Okutsu, Yokohama, all of Japan

[73] Assignee: Nikon Corporation, Tokyo, Japan

[21] Appl. No.: 753,894

[22] Filed: Dec. 2, 1996

[30] Foreign Application Priority Data

Dec. 4, 1995 [JP] Japan ................................. 7-315268
Dec. 4, 1995 [JP] Japan ................................. 7-315269
Dec. 4, 1995 [JP] Japan ................................. 7-315270
Dec. 4, 1995 [JP] Japan ................................. 7-315271

[51] Int. Cl.⁶ .................................................. G03B 21/14
[52] U.S. Cl. .......................................... 353/25; 353/26 A
[58] Field of Search .............................. 353/27 A, 26 A, 353/25, 27 R, 26 R, 122; 355/41

[56] References Cited

U.S. PATENT DOCUMENTS

| | | |
|---|---|---|
| 4,669,838 | 6/1987 | Hibbard ................... 353/27 A |
| 4,745,489 | 5/1988 | Kashiwagi et al. .......... 353/26 A |
| 4,825,065 | 4/1989 | Imai ............................ 353/26 A |
| 4,875,768 | 10/1989 | Hirasawa et al. .......... 353/27 A |
| 4,978,985 | 12/1990 | Smart et al. . |
| 5,032,861 | 7/1991 | Pagano . |
| 5,160,950 | 11/1992 | Niizawa ..................... 353/27 A |
| 5,690,406 | 11/1997 | Furukawa et al. .......... 353/27 A |

FOREIGN PATENT DOCUMENTS

A-57-5922  3/1993  Japan .

*Primary Examiner*—William Dowling
*Attorney, Agent, or Firm*—Oliff & Berridge, PLC

[57] ABSTRACT

The film image signal outputting apparatus of the present invention includes: an imaging section which forms an image of a developed film; a display condition setting section which sets a display condition for a film image which is displayed; and an image display signal output section which outputs a signal for displaying the image of the film which is formed by the imaging section, according to the display condition, wherein the display condition setting section cancels a display condition which was set for a film frame before outputting a signal to display an image of a next film frame.

27 Claims, 23 Drawing Sheets

FIG. 20A
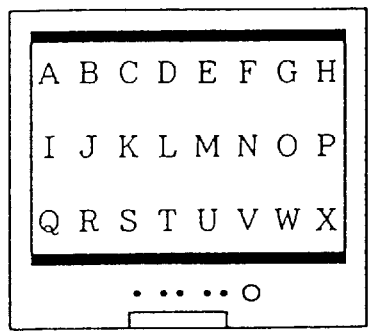 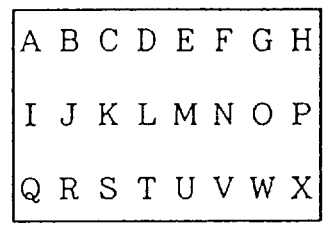
FIG. 20B
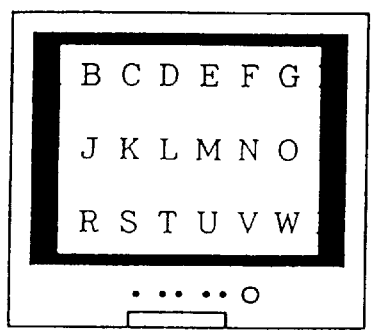 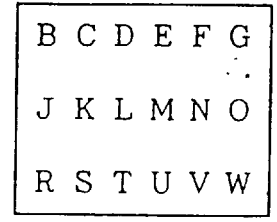

FILM IMAGE SIGNAL OUTPUTTING APPARATUS

BACKGROUND OF THE INVENTION

1. Field of the Invention

The present invention relates to an apparatus which outputs a signal for displaying an image on a film which has been developed upon a monitor or the like.

2. Description of the Related Art

An apparatus which displays an image on a photographic film which has been developed upon a monitor for enjoyment is known (for example, refer to Publication of Japanese Patent Laying Open Application No. Heisei 5-75922).

Now it may happen that, when the film image is being displayed upon the monitor, it is desired to alter the display conditions for the film image. For example, it may be required to magnify or shrink the film image by zooming, to shift it upwards or downwards or leftwards or rightwards, or to rotate an image which was photographed in a vertical position to a correct position. Further, it may also be required to correct the colors of the film image which is being displayed upon the monitor, or to change its aspect ratio by masking the top, bottom, left, or right of the screen.

However, when the image of the next film frame is displayed after performing zooming, shifting, rotation, color correction, aspect ratio changing or the like for the image of some film frame which is being displayed upon the monitor, since this next film frame is displayed with the same display conditions which were set for the previous film frame, the problem arises that this image of the next film frame is displayed with a range and color condition which are different from the range and color condition with which it was photographed.

Further, if zooming, shifting, rotation, color correction, aspect ratio changing or the like is performed for the image of some film frame which is being displayed upon the monitor and then this film image is printed, the problem arises that the user may lose his bearings due to the difference between the monitor image and the printed image, since the printing is not performed according to the display conditions for the monitor image even though the film image display conditions have changed.

Further, if the aspect ratio of the image of some film frame is changed and it is displayed upon the monitor, and this film frame is printed, the problem arises that the user may lose his bearings due to the difference between the monitor image and the printed image, since the printing is not performed according to the aspect ratio for the monitor image.

Moreover, in some cameras the film cartridge chamber is upon the left side of the aperture, and in other it is upon the right side thereof. The tops and bottoms of images photographed with these two types of cameras are mutually reversed. Accordingly, if images upon films which have been photographed with cameras with different film cartridge chambers are displayed as described above, the problem arises that some of the film images are displayed reversed top to bottom.

SUMMARY OF THE INVENTION

A first objective of the present invention is to propose a film image signal outputting apparatus which automatically cancels the film image display condition which was set for some film frame when the image of a different film frame is displayed.

A second objective of the present invention is to propose a film image signal outputting apparatus which, when printing is designated, cancels the display condition which was set for the designated film frame, and outputs a signal which displays the printing image of this film frame.

A third objective of the present invention is to purpose a film image signal outputting apparatus which is capable of changing the printing aspect ratio.

A fourth objective of the present invention is to propose a film image signal outputting apparatus which outputs a signal which displays a film image in the correct orientation.

In order to achieve the first above described objective, the film image signal outputting apparatus according to the present invention comprises: an imaging section which forms an image of a developed film; a display condition setting section which sets a display condition for a film image which is displayed; and an image display signal output section which outputs a signal for displaying the image of the film which is formed by the imaging section, according to the display condition, wherein the display condition setting section cancels a display condition which was set for a film frame before outputting a signal to display an image of a next film frame.

In order to achieve the second above described objective, the film image signal outputting apparatus according to the present invention comprises: an imaging section which forms an image of a developed film; a display condition setting section which sets a display condition for a film image which is displayed; an image display signal output section which outputs a signal for displaying the image of the film which is formed by the imaging section according to the display condition; a print designation input section for inputting a designation related to print; and a control section which, when the designation related to print is input by the print designation input section for a film frame for which a signal is being output for displaying according to the display condition which was set by the display condition setting section, emits a warning in a case that a display image according to the display condition and a print image disagree.

In order to achieve the third above described objective, the film image signal outputting apparatus according to the present invention comprises: an imaging section which forms an image of a developed film; a display condition setting section which sets a display aspect ratio for a film image which is displayed; an image display signal output section which outputs a signal for displaying the image of the film which is formed by the imaging section, according to the display condition; a print designation input section for inputting a designation related to print; and an information recording section which, when the designation related to print is input while the display aspect ratio is set by the display condition setting section, along with recording the designation related to print upon the film, changes a print aspect ratio which is recorded upon the film to a value of the display aspect ratio which is set by the display condition setting section and records the changed print aspect ratio upon the film.

In order to achieve the fourth above described objective, the film image signal outputting apparatus according to the present invention comprises: an imaging section which forms an image of a developed film; an image display signal output section which outputs a signal for displaying the image of the film which is imaged by the imaging section; an image rotation section which rotates the film image which is displayed; and a storage section which stores a initial rotational position of the film image.

DESCRIPTION OF THE PREFERRED EMBODIMENT

Figure 1:
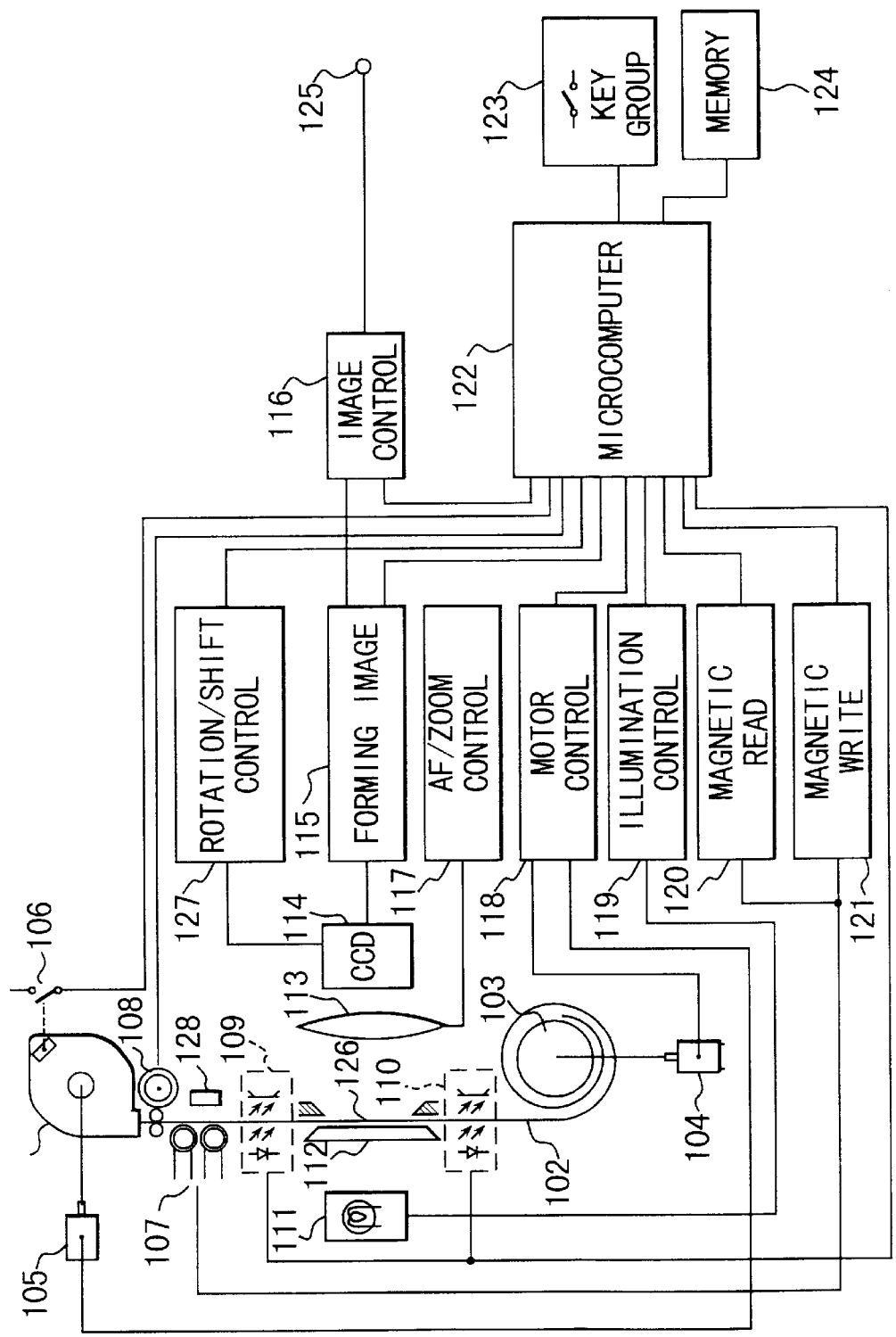
FIG. 1 is a functional block diagram showing the structure of an embodiment.

FIG. 1 shows the structure of one embodiment of the film image signal outputting apparatus.

A cartridge 101 and a film 102 are of a drop in loading type in which when not yet used the film 102 is completely stored within the cartridge 101 while during use the film 102 is projected out from the cartridge 101, as disclosed in U.S. Pat. No. 5,032,861 or Japan Laid-Open Patent Publication No. 3-75741 (which corresponds to U.S. Pat. No. 4,978, 985); and a mechanism is comprised within the cartridge 101 which displays the state of use of the film 102—either not yet exposed, exposure completed, development completed, or the like.

The transporting of the film 102 is performed by a spool 103 of the film image signal outputting apparatus and by a motor 104, and by a spool of the cartridge 101 and by a motor 105. The spool 103 is driven by the motor 104 to wind the film 102 onwards, and the spool of the cartridge 101 is driven by the motor 105 to project the film 102 and to rewind it.

A switch 106 is operated together with a mechanism which is provided to the cartridge 101 and which shows the state of use thereof, and detects whether or not the film 102 is developed. A magnetic head 107, along with reading in information which is magnetically recorded upon the film 102, records information magnetically upon the film 102. A film encoder 108 rotates together with the displacement of the film, and measures the speed of displacement and the distance of displacement of the film 102. Interruptors 109 and 110 detect perforations in the film 102.

An illumination light source 111 illuminates the film 102. A scattering plate 112 converts light emitted from the illumination light source 111 to white and scatters it, and also serves as a pressure plate for the film 102. A photographic lens 113 focuses an image of the film 102 in an image area 126 upon a CCD camera 114, and the CCD camera 114 reads in this image in the image area 126 and converts it into an electric signal.

An imaging circuit 115 converts the image signal from the CCD camera 114 into a video signal. An image control circuit 116 processes the video signal from the imaging circuit 115 and generates the desired image. This image control circuit 116 is endowed with a superimposition function.

An AF/zoom control circuit 117 shifts the photographic lens 113 so as to perform focus adjustment and zooming. A rotation and shifting control circuit 127 controls the rotation and the shifting in the X and Y directions of a CCD camera 114 via a motor which is not shown in the figures. A motor control circuit 118 controls the driving of the winding on motor 104 and of the rewinding motor 105. Further, an illumination control circuit 119 performs turning on and off of the illumination light source 111.

A magnetic reading in circuit 120 amplifies and decodes a signal which is read in from the film 102 via the magnetic head 107, and a magnetic writing circuit 121 writes information onto the film 102 via the magnetic head 107.

A microcomputer 122 (hereinafter referred to as a CPU) controls the various devices described above, and thereby controls the operations of the film image signal outputting apparatus, such as transporting the film and reproducing the image. A key group 123 is an operation member for the user to designate operations and to input information etc., and comprises a switch group for correcting the color of the monitor image, operation switches for shifting the film image which is displayed upon the monitor screen upwards, downwards, leftwards, and rightwards, and a rotation switch for rotating the film image. A memory 124 records information which has been recorded upon the film 102, image information for the images upon the film 102, and the like. It is noted that, according to the memory capacity, it is also possible to reduce the amount of image information for each film frame. Furthermore, it would also be acceptable to provide an image compression function. A video output 125 is a terminal for outputting an image signal to a monitor, a video, a printer, or the like. Although the monitor may be a CRT or an LCD or a plasma display or the like, it is also possible to utilize an ordinary type of television.

It should be noted that, although the film image signal outputting apparatus of this embodiment is endowed with the function of shifting the image which has been displayed upon the monitor in the upwards and downwards directions and in the leftwards and rightwards directions, and with the function of detecting whether or not the image is shifted upwards or downwards or leftward or rightwards and also of detecting the amount of this shifting, and with the function of detecting whether or not the image is rotated and also of detecting the amount of this rotation, and with a zoom function for magnifying a portion of the image which has been displayed upon the monitor screen, the detailed explanation of these functions will be omitted.

FIGS. 2 through 17 are control flow charts for the CPU 122. The operation of this embodiment will now be explained with reference to these flow charts.

When in a step S201 a cartridge 101 is loaded, in a step S202 the state of use of the cartridge 101 which has been loaded is checked by a switch 106. If the film 102 has been developed, then the processing in a step S203 and thereafter is executed, while if it has not been developed then the flow of control proceeds to a step S217 and the cartridge 101 is removed. It should be noted that it would also be acceptable to provide a cartridge ejection mechanism which automatically ejects the cartridge.

If the film 102 of the cartridge 101 which has been loaded is a developed one, then in the step S203 information related to the film 102 is read in by an information reading in device not shown in the figures. This information includes whether the film is negative or reversal, color or monochrome, ISO sensitivity, and number of frames that can be shot. Next in a step S204 the motors 104 and 105 are drive controlled and the film 102 is projected out from the cartridge 101, and is wound up onto the spool 103. Since the cartridge 101 which is used in this embodiment is one in which the film 102, in its not yet used state, is entirely stored within the cartridge 101, therefore, when the film 102 is to be used, the cartridge spool is driven by the motor 105 so as to project the film 102 out from the cartridge 101 (in the following, this action will be termed "thrust").

In a step S205, whether initial setting is taking place or the film is being advanced is displayed as superimposed upon the monitor screen. At this time, no film image is displayed based upon the image signal from the CCD camera 114. In a step S206, the information which is recorded upon a magnetic recording portion of the film 102 is reproduced. This information includes information related to photography, date/time, print aspect ratio, positioning of the film cartridge chamber, and the like.

In this connection, there are cameras in which the film cartridge chamber is on the left side of the aperture and ones in which it is on the right side thereof. Photographic images from these two types of cameras are mutually opposite with respect to their upper and lower sides. Thus, information relating to the positioning of the film cartridge in the camera with which it was shot is recorded upon the magnetic recording portion of the film 102, and the orientation of the upper and lower sides of the film image is detected based upon this information, and adjustment is performed for each film so as to display the image in the correct orientation. Although this information is stored upon the magnetic recording portion of each film frame of the film, it would also be acceptable to store it only in the magnetic recording portion of the leader portion of the film, and to read it in only once during the thrust process.

In this connection, among the cartridges which may be loaded, a cartridge may also be included which has been shot using a camera which is not endowed with any function of magnetically recorded information, but which is endowed with a function of recorded information optically. In order also to be compatible with this type of cartridge, in a step S207 information which has been recorded optically is read in by an optical read in device 128. This optical read in device 128 is disposed in a position which corresponds to a predetermined position upon the film, and is a device which optically reads in characters or predetermined codes such as bar codes or the like. For example, it may be structured as a photodiode and a phototransistor, or as an electrical circuit which detects the signal which is output from a phototransistor, or the like. The contents of this information are identical to the magnetic recorded information described above.

In a step S208, a check is made as to whether or not the reading-in of the magnetic recorded information or of the optical recorded information for all of the film frames has been completed. In this embodiment, when the cartridge 101 is loaded, first the magnetic recorded information or the optical recorded information for each of the film frames is read in while the film 102 is advanced as far as the final film frame. If the reading-in of the information for all of the film frames has been completed, then in a step S209 the advancement of the film is stopped. And in steps S201 through S212 the motor 105 is drive controlled so as to start the rewinding of the film 102, and when the first film frame upon the film 102 has reached a position opposing the aperture of the image area 126 the movement of the film is stopped.

In a step S213 the arrangement of the cartridge chamber of the camera with which photography was performed is decided upon, based upon the magnetic recorded information or the optical recorded information which has been read in the above described steps S206 and S207. When the arrangement of the cartridge chamber has been detected, in a step S214, the initial rotational position of the CCD camera 114 is determined upon, based upon the arrangement of the cartridge chamber of the camera with which photography was performed. If a camera in which the film cartridge chamber is on the left side (or the right side) of the aperture is taken as a standard, then the initial rotational position for a camera in which it is on the right side (or the left side) is a position rotated by 180 degrees from the initial rotational position for a standard camera. In a step S215 the CCD camera 114 is rotated to its initial rotational position, and next in a step S215 this initial rotational position is stored.

When performing photography with a camera of which the film cartridge chamber has a different arrangement, the images which are exposed onto the film are reversed top to bottom. If images upon this type of film are displayed upon the monitor without rotating the CCD camera 114, then undesirably these images will be reversed top to bottom.

Thus, in this embodiment, it is possible to display the image upon the monitor in the correct orientation, by deciding upon the arrangement of the film cartridge chamber of the camera with which photography was performed based upon the information which has been recorded magnetically or optically upon the film, and by rotating the CCD camera 114 according to this arrangement.

In a step S301, the aspect ratio during photography and the print aspect ratio are determined based upon the magnetic recorded information or the optical recorded information which was read in the step S206 or the step S207. Next in a step S302 a mask is set, and the image displayed upon the monitor is made to agree with the print aspect ratio of the film. In a step S303, along with displaying the film image of the film frame which is opposed to the aperture, information such as the date/time, the film frame no, etc. and the mask which was set in the step S302 are displayed as superimposed.

In a step S304, a check is made as to whether or not the initial rotational position has been changed by the use of an initial rotational position change switch of the key group 123. If for example there are a large number of images taken in the vertical photographic position or the like and it is desired to change the initial rotational position of the CCD camera 114 which was set in the above described step S214, then it is possible to change it by the use of the initial rotational position change switch. If the initial rotational position has been changed, then in a step S306 the CCD camera 114 is rotated up to the initial position which has been changed to, and next in a step S307 this position is stored as the initial rotational position.

Figure 5:
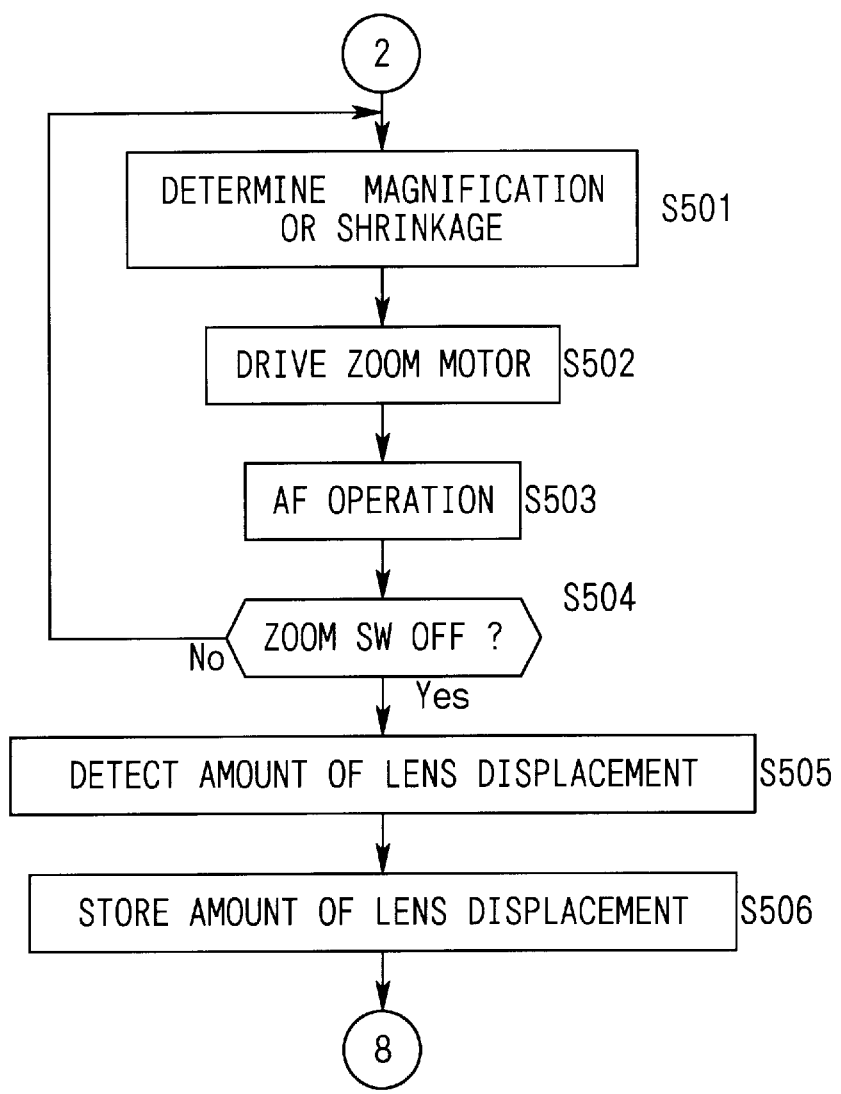
FIG. 5 continues on from FIG. 4, and is a flow chart showing the control program for film image display.

In a step S308 a check is made as to whether or not a zoom switch which magnifies or shrinks the film image which is displayed upon the monitor has been operated, and if the zoom switch has been operated then the flow of control is transferred to a step S501 of FIG. 5 and a zoom procedure is performed. In a step S309 a check is made as to whether or not a shift switch which shifts the film image which is displayed upon the monitor upwards, downwards, leftwards, and rightwards has been operated, and if the shift switch has been operated then the flow of control is transferred to a step S601 of FIG. 6 and a shift procedure is performed. In a step S310 a check is made as to whether or not a switch which corrects the color of the film image which is displayed upon the monitor has been operated, and if the color correction switch has been operated then the flow of control is transferred to a step S701 of FIG. 7 and color correction is performed. Such color correction may be correction of R, G, and B, correction of contrast and brightness, or the like.

Figure 8:
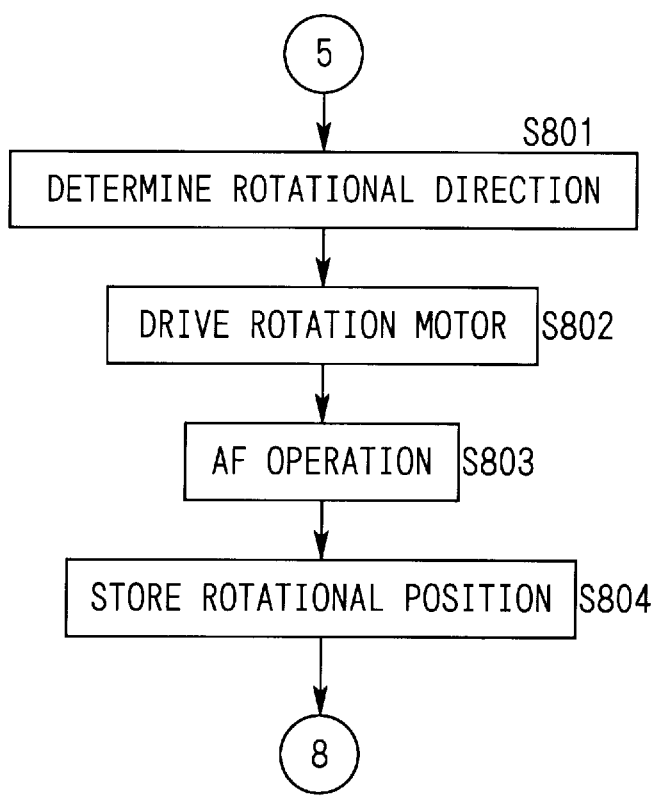
FIG. 8 continues on from FIG. 7, and is a flow chart showing the control program for film image display.

In a step S311, a check is made as to whether or not a switch which rotates the film image which is displayed upon the monitor through 90 degrees, 180 degrees, or 270 degrees has been operated, and if the rotation switch has been operated then the flow of control is transferred to a step S801 of FIG. 8 and an image rotation procedure is performed. In a step S312, a check is made as to whether or not a mask switch which masks the film image which is displayed upon the monitor has been operated, and if the mask switch has been operated then the flow of control is transferred to a step S901 of FIG. 9 and a masking procedure is performed. Here it is possible to select an aspect ratio, for example a Hi-Vision size of 9×16, a normal photograph size of 3×4, a panorama size, or the like.

Figure 2:
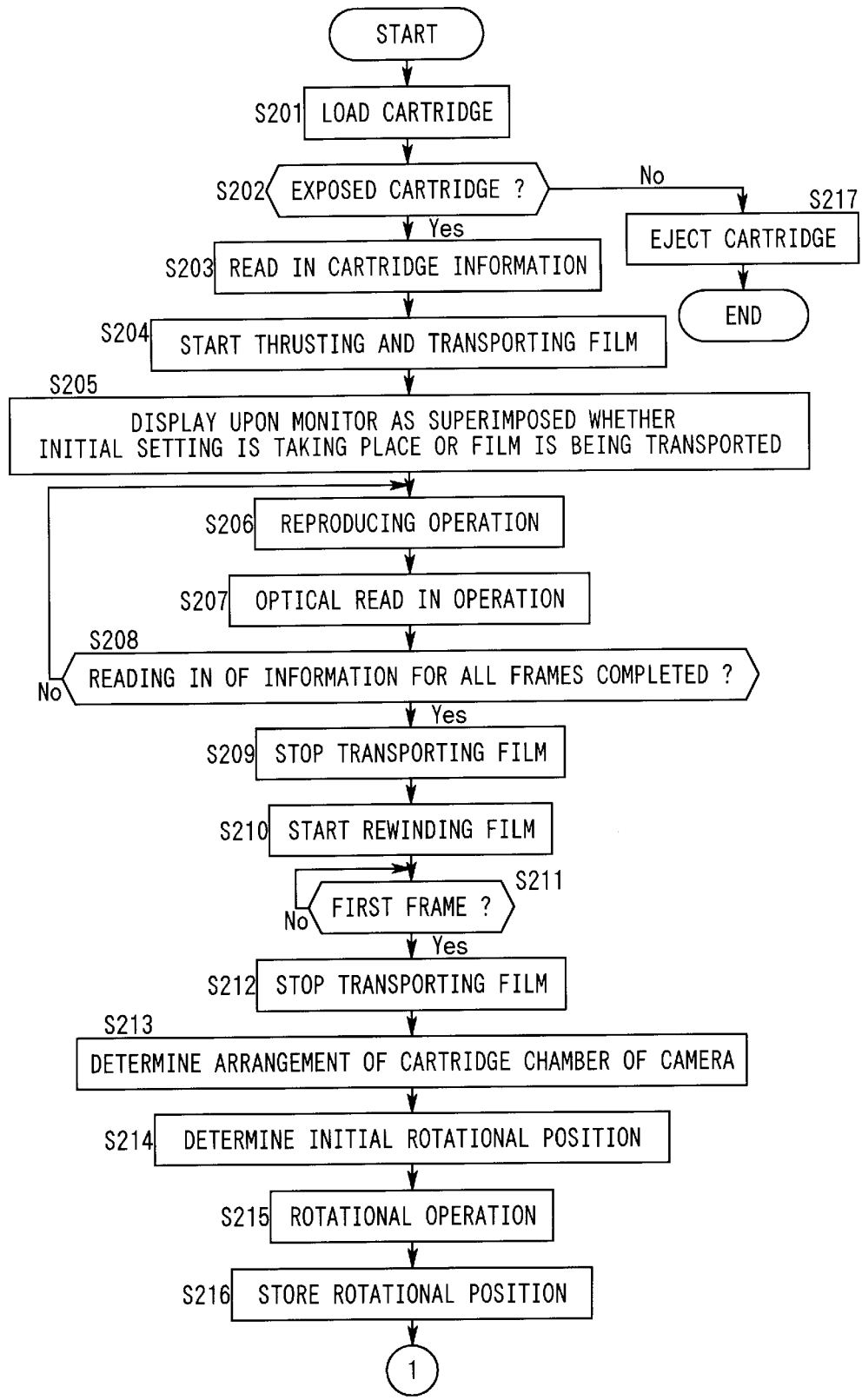
FIG. 2 is a flow chart showing a control program for film image display.

In the procedure shown in FIG. 2, the arrangement of the film cartridge of the camera with which photography was performed is determined, and the initial rotational position of the CCD camera 114 is set according to this arrangement.

Since the arrangement of the film cartridge is determined for each camera individually, the recording of the information related to the arrangement of the film cartridge upon the film magnetically or optically is easy. However, it is possible to choose any photographic posture for each film frame individually during photography, and it is necessary to detect the direction of top and bottom for each film frame individually even with a film which has been shot with the same camera. If the direction of top and bottom is recorded magnetically or optically it is possible to display the film image upon the monitor in the correct orientation according to this direction of top and bottom, but many cameras are not equipped with the function of detecting the top and bottom direction during photography, so that it is not possible to rotate the film image automatically.

The initial rotational position which is set according to the arrangement of the film cartridge assumes that photography has been performed with the camera being positioned in the normal position (the horizontal position). However, it may happen that more photographs have been taken in the vertical position than have been taken in the normal position, and if the images upon this type of film on which the number of film frames which have been shot in the vertical position is large are displayed upon the monitor, the number of images which are lying upon their sides becomes large.

Thus, in the event that the images upon a film on which the number of film frames which have been shot in the vertical position is large are to be displayed upon the monitor, the CCD camera 114 is rotated through 90 degrees from the initial rotational position which was set according to the arrangement of the film cartridge, in order to display the images of the film frames which were shot in the vertical position in the correct orientation upon the monitor. By doing this, it is possible to display the majority of the film frames in the correct orientation.

Steps S401 through S406 are the procedure related to the film transporting mode. First, in a step S401, a check is made as to whether or not a stepwise transporting mode is selected. The stepwise transporting mode is an transporting mode in which the film 102 is automatically transported one film frame at a time, with the image of each film frame being displayed in order. If the stepwise transporting mode is selected, the flow of control proceeds to a step S1001 of FIG. 10 and a stepwise transporting mode procedure is performed. In a step S402 a check is made as to whether or not a single frame wind on mode is selected, and if the single frame wind on mode is selected the flow of control proceeds to a step S1201 of FIG. 12 and a single frame wind on procedure is performed.

Figure 13:
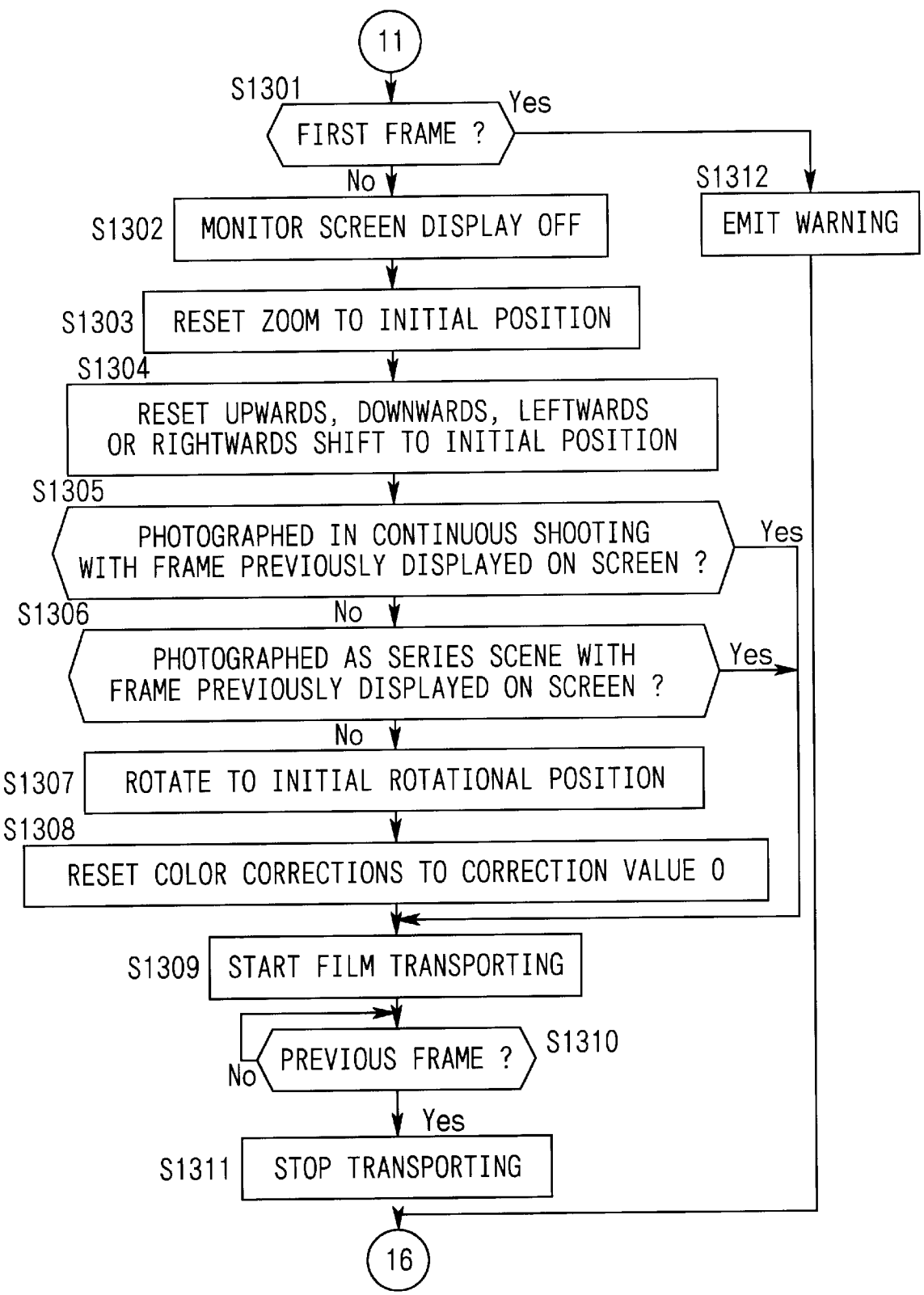
FIG. 13 continues on from FIG. 12, and is a flow chart showing the control program for film image display.

In a step S403 a check is made as to whether or not a single frame rewind mode is selected, and if the single frame rewind mode is selected the flow of control proceeds to a step S1301 of FIG. 13 and a single frame rewind procedure is performed. In a step S404 a check is made as to whether or not a specified film frame transporting mode is selected in which the film is transported up to a specified film frame, and if the specified film frame transporting mode is selected the flow of control proceeds to a step S1401 of FIG. 14 and transporting to the specified film frame is performed.

Figure 15:
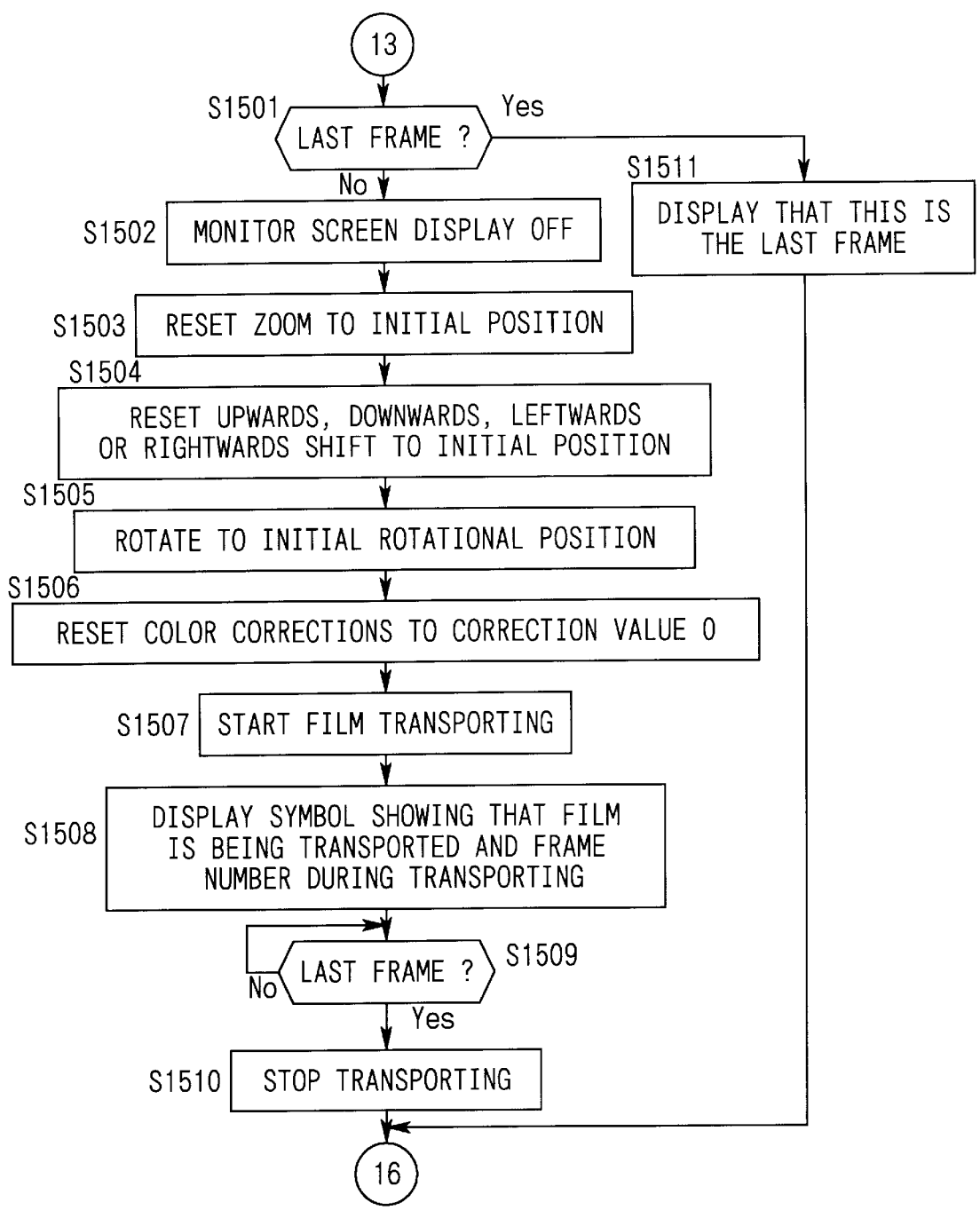
FIG. 15 continues on from FIG. 14, and is a flow chart showing the control program for film image display.

In a step S405 a check is made as to whether or not an all film frames wind on mode is selected, and if the all film frames wind on mode is selected the flow of control proceeds to a step S1501 of FIG. 15 and all of the film frames are wound on. In a step S406 a check is made as to whether or not an all film frames rewind mode is selected, and if the all film frames rewind mode is selected the flow of control proceeds to a step S1601 of FIG. 16 and all of the film frames are rewound.

Figure 17:
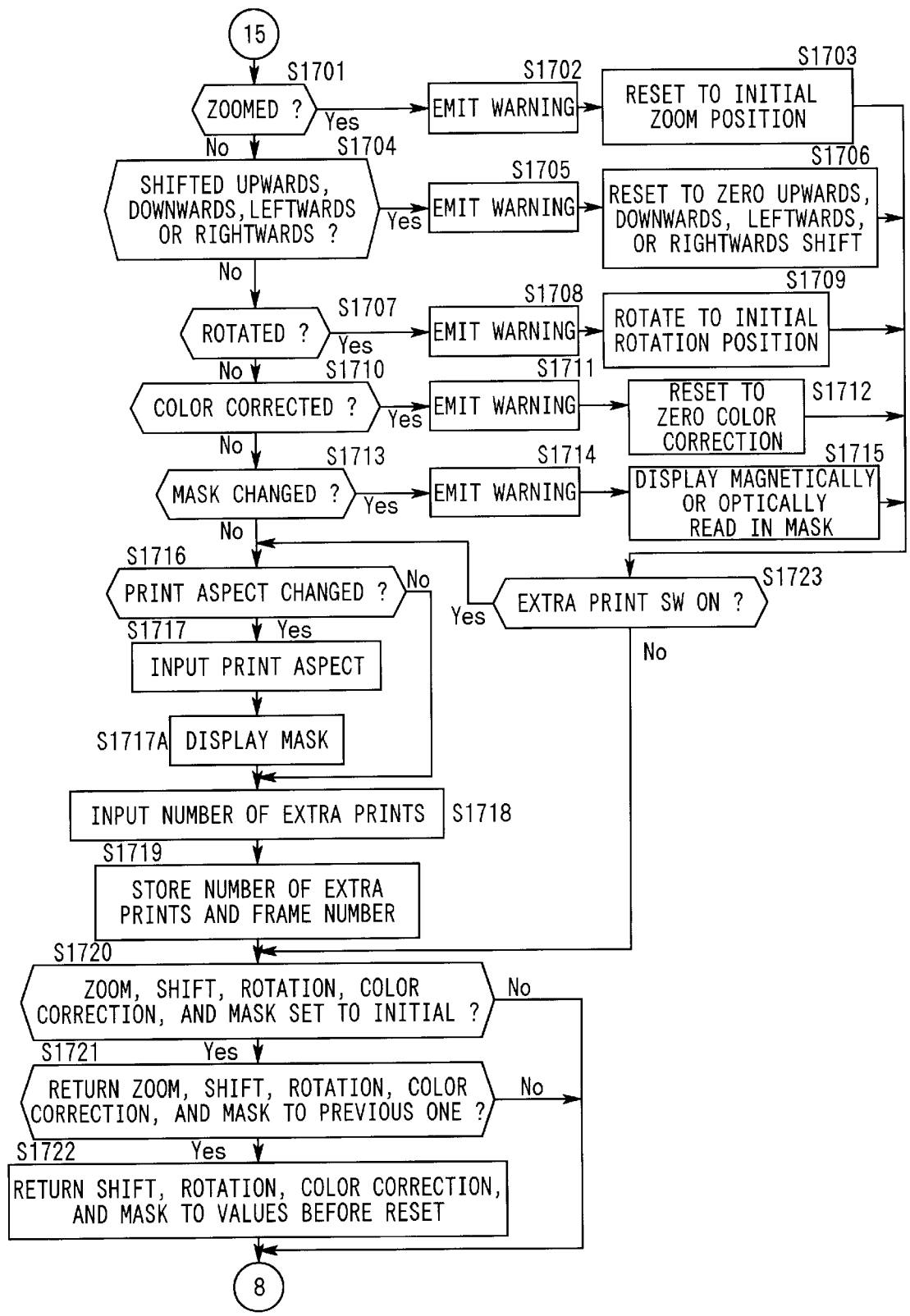
FIG. 17 continues on from FIG. 16, and is a flow chart showing the control program for film image display.

In a step S407 a check is made as to whether or not an extra print designation switch for ordering extra prints is being operated, and if print designation is being performed then the flow of control proceeds to a step S1701 of FIG. 17 and magnetic recording is performed regarding the film frame for the extra print and the number of extra prints on the film 102, and the order is performed.

Next, the zooming procedure will be explained with reference to FIG. 5.

In a step S501 it is decided whether the film image which has been displayed upon the monitor is to be magnified or shrunk according to a zoom switch which is being operated. In a step S502 a zoom motor not shown in the figures is driven by the AF/zoom control circuit 117 and zooming of the photographic lens 113 is performed. Next in a step S503, if the focus has been disturbed due to the zooming of the photographic lens 113, an AF motor not shown in the figures is driven by the AF/zoom control circuit 117 and focusing of the photographic lens 113 is performed.

During the operation of the zoom switch, the zooming of the photographic lens 113 and the accompanying focusing are performed, and when in a step S504 the zoom switch goes off then the flow of control proceeds to a step S505 in which the amount of displacement of the photographic lens 113 is detected by a displacement amount detection sensor not shown in the figures. And in a step S506 the amount of displacement of the lens is stored in the memory 124 and the flow of control returns to the step S304 of FIG. 3.

Figure 6:
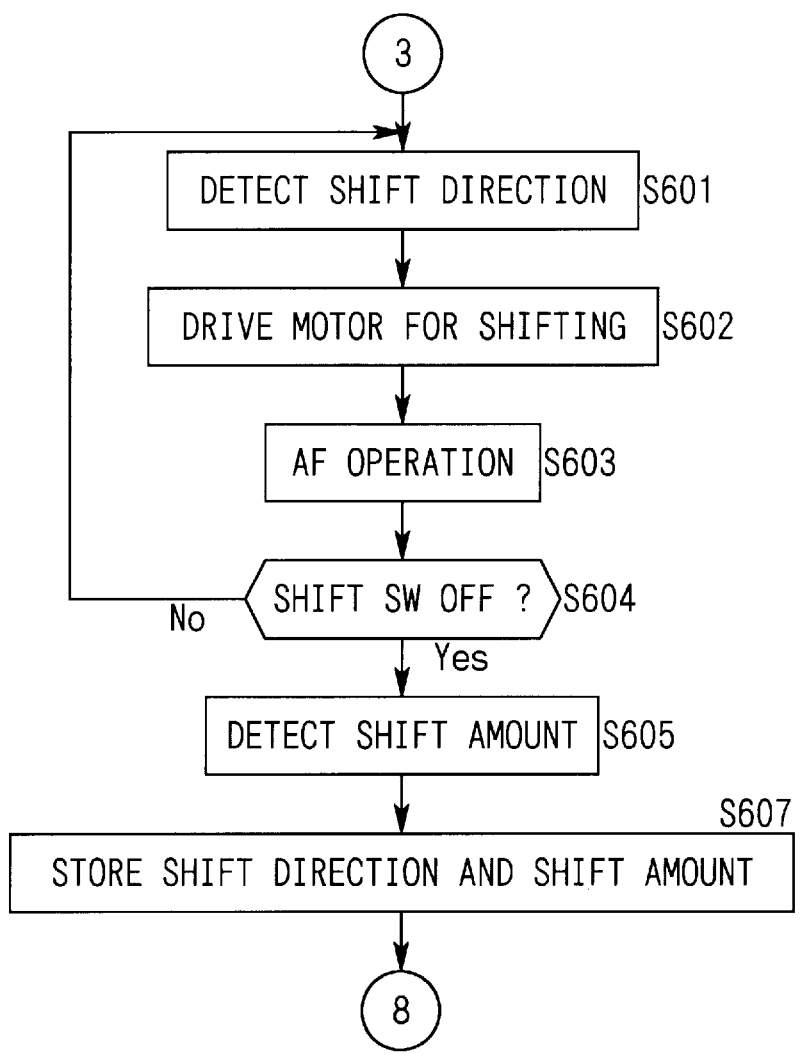
FIG. 6 continues on from FIG. 5, and is a flow chart showing the control program for film image display.

The shift procedure will be explained with reference to FIG. 6.

In a step S601 it is decided in which of the upwards, downwards, leftwards, or rightwards directions the film image which has been displayed upon the monitor is to be shifted, according to a shift switch which is being operated. In a step S602 the CCD camera 114 is shifted with respect to the film by the rotation and shifting control circuit 127 and by a motor not shown in the figures, and upwards, downwards, leftwards, or rightwards shifting is performed. Next in a step S603, if the focus has been disturbed due to the shifting of the CCD camera 114, focusing of the photographic lens 113 is performed and the focus is set.

During the operation of the shift switch the above described shifting operation is performed, and when in a step S604 the shift switch goes off then the flow of control proceeds to a step S605 in which the direction of shifting and the amount of shifting of the CCD camera 114 are detected by a shift amount detection sensor not shown in the figures. And in a step S607 the direction of shifting and the amount of shifting are stored in the memory 124 and the flow of control returns to the step S304 of FIG. 3.

Figure 7:
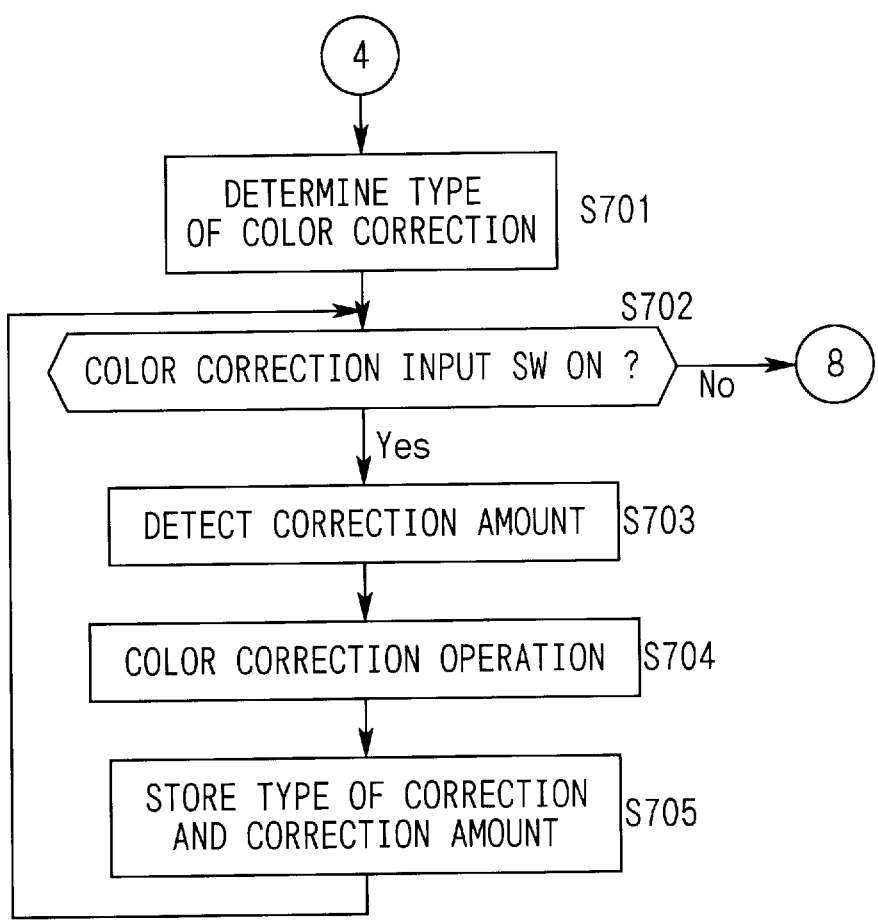
FIG. 7 continues on from FIG. 6, and is a flow chart showing the control program for film image display.

The color correction procedure will be explained with reference to FIG. 7.

In a step S701 the type of color correction for the film image which has been displayed upon the monitor is decided upon. When in a step S702 a color correction input switch is operated, the flow of control proceeds to a step S703, and the amount of color correction is detected. For the color correction amount, it will be acceptable to display a superimposed bar, and to display the amount of color correction by the length of the bar, as in the way in which the sound volume upon a television is generally adjusted at the present time. In a step S704 the color correction is performed according to the correction amount which has been input, and next in a step S705 the type of color which has been corrected and the amount of correction are stored in the memory 124. This color correction procedure is performed until the color correction input switch goes off, and when the color correction input switch goes off the flow of control returns to the step S304 of FIG. 3.

The rotation procedure for the film image will be explained with reference to FIG. 8.

In a step S801 the rotational direction for the film image which has been displayed upon the monitor is determined, according to a rotation switch which has been operated. The rotation of the film image is performed by rotating the CCD camera 114. In a step S802, the CCD camera 114 is rotationally driven via a rotating and shifting control circuit and a motor not shown in the figures. In a step S803, if the focus has been disturbed due to the rotation of the CCD camera 114, focusing of the photographic lens 113 is performed and the focus is set. And in a step S804 the amount of rotation is stored in the memory 124 and the flow of control returns to the step S304.

Figure 9:
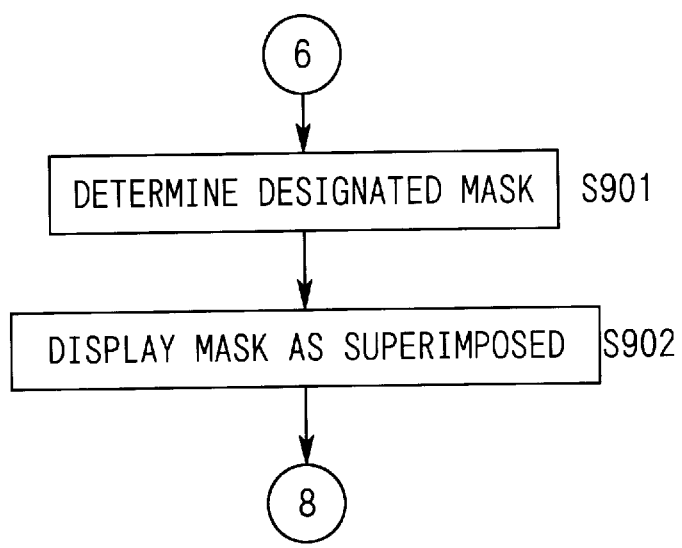
FIG. 9 continues on from FIG. 8, and is a flow chart showing the control program for film image display.

The mask procedure will be explained with reference to FIG. 9.

In a step S901 which mask has been designated, or whether mask cancellation has been designated, and the details of such designation are determined upon. Next in a step S902 the mask which has been designated is displayed upon the monitor screen as superimposed. It should be understood that if mask cancellation has been designated the display of the mask is stopped.

Figure 10:
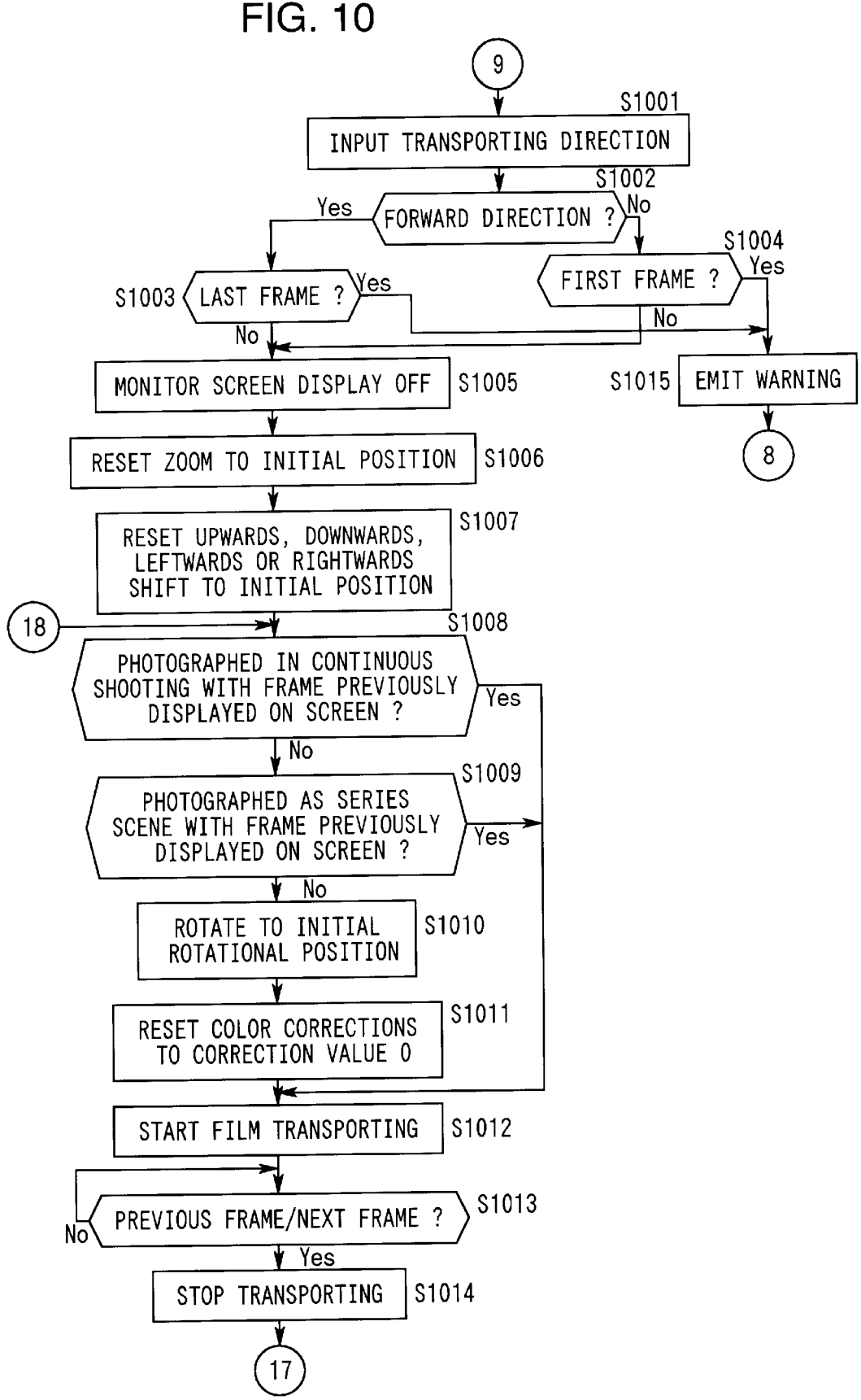
FIG. 10 continues on from FIG. 9, and is a flow chart showing the control program for film image display.
Figure 11:
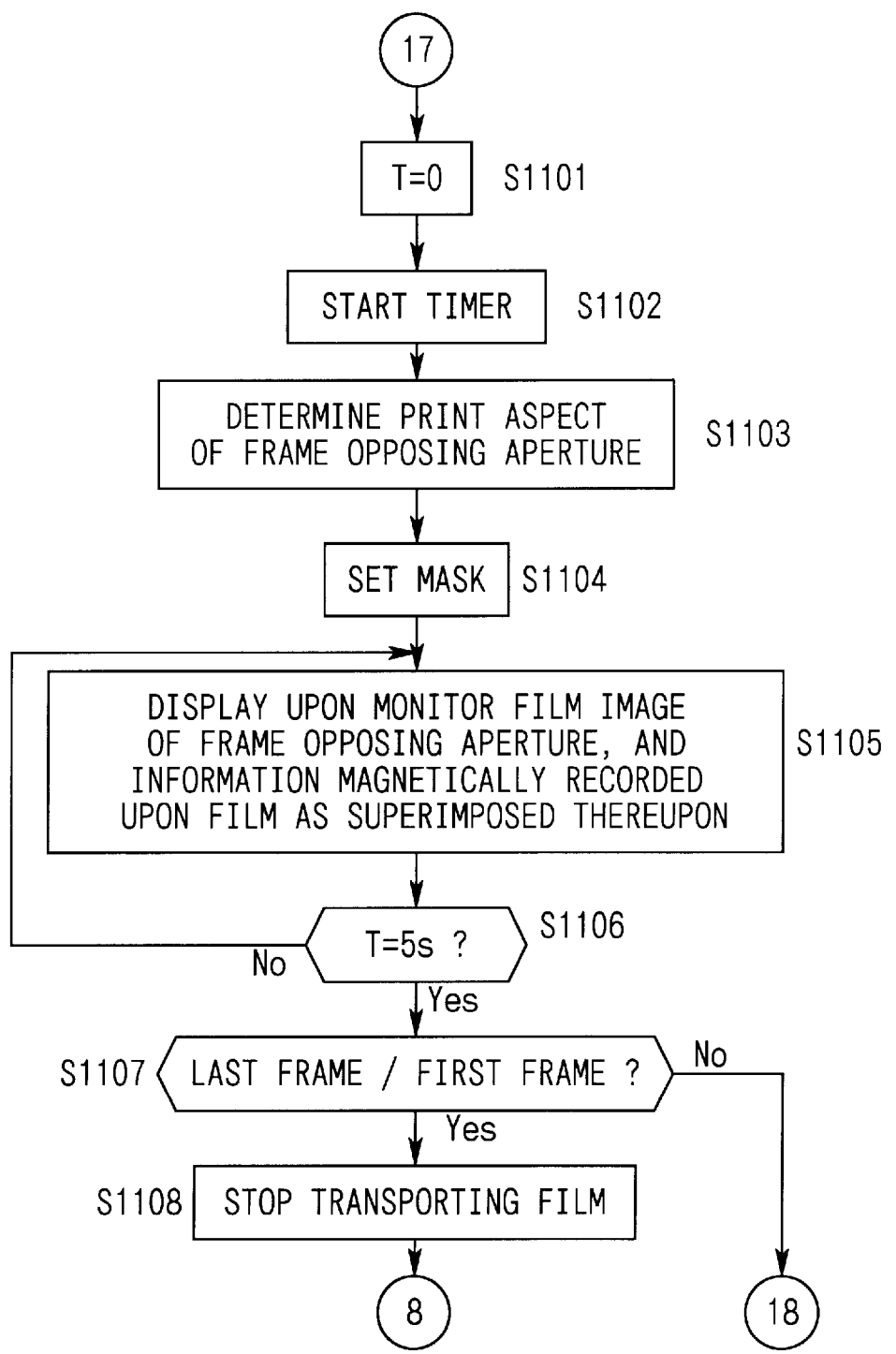
FIG. 11 continues on from FIG. 10, and is a flow chart showing the control program for film image display.

Next, the processing for the stepwise transporting mode procedure will be explained with reference to FIGS. 10 and 11.

In a step S1001, whether the film 102 is to be transported stepwise in the winding on direction or in the rewinding direction is input. Next in a step S1002 the transporting direction which has been input is distinguished, and if it is the forward direction—i.e. the winding on direction—then the flow of control proceeds to a step S1003, while if it is the reverse direction—i.e. the rewinding direction—then the flow of control proceeds to a step S1004. In the case of the winding on direction, in the step S1003 it is checked whether or not the film frame which currently is opposed to the aperture is the last film frame, and in the case of the last film frame a warning is emitted in a step S1015, since further winding on is not possible; and the flow of control returns to the step S304 of FIG. 3. On the other hand, in the case of the rewinding direction, in the step S1004 it is checked whether or not the film frame which currently is opposed to the aperture is the first film frame, and in the case of the first film frame a warning is emitted in the step S1015, since further rewinding is not possible; and the flow of control returns to the step S304 of FIG. 3.

In a step S1005, the display of the current film image upon the monitor, and the superimposed display of the information such as date/time, film frame number, and the like, are stopped. In a step S1006, the photographic lens 113 is zoomed so as to be reset to its initial position, and next in a step S1007 the CCD camera 114 is driven so as to be shifted, and is reset back to its previous initial position.

In a step S1008, it is decided whether or not the film frame which is currently opposed to the aperture and the next film frame which is to be opposed to the aperture are film frames which were shot with continuous shooting, based upon the magnetic recorded information or the optical recorded information upon the film 102. In the case of continuous shooting film frames which were photographed continuously while transporting the film, the flow of control proceeds to a step S1012. If these are not continuous shooting film frames, then in a step S1009 it is decided whether or not the film frame which is currently opposed to the aperture and the next film frame which is to be opposed to the aperture are series film frames which were photographed with the same scene, based upon the magnetic recorded information or the optical recorded information upon the film 102. If they are series film frames which were photographed with the same scene, then the flow of control proceeds to the step S1012, while otherwise the flow of control proceeds to a step S1010. If they are neither continuous shooting film frames nor series film frames, then in the step S1010 the CCD camera 114 is rotated to its initial rotational position, and next in a step S1011 all of the color correction amounts are reset to zero.

On the other hand, if the film frame in the display and the next film frame are film frames which were photographed in the continuous shooting mode or are series film frames which were photographed with the same scene, then these film frames are displayed under the identical display conditions, without changing the rotational position and the color correction amount of the film image.

In the step S1012, the transporting of the film 102 is started. In a step S1013 the film is transported until in the case of transporting in the forward direction the next film frame opposes the aperture, and in the case of transporting in the reverse direction the previous film frame opposes the aperture, and in a step S1014 the transporting of the film is stopped.

In steps S1101 and S1102 a timer T is reset and is started. In a step S1103 the print aspect ratio of the film frame which is opposed to the aperture is decided based upon the magnetic recorded information or the optical recorded information upon the film 102, and next in a step S1104 a mask is set according to the designated print aspect ratio. In a step S1105, along with displaying the film image of the film frame which is opposed to the aperture, information such as date/time, film frame number, and the like and the mask which was set in the step S1103 are displayed as superimposed thereupon.

In this embodiment, in the stepwise transporting mode, the image of each film frame is displayed for a period of five seconds. It should be noted that the time period for display of each film frame in the stepwise transporting mode is not limited by this embodiment. Further, it would also be acceptable for the user to be able to set the time period for display for each film frame at will.

In a step S1107 it is checked whether or not the film has been transported, in the case of the forward direction, as far as the last film frame, and in the case of the reverse direction, the first film frame; and if it has been transported as far as the last or the first film frame then the flow of control proceeds to a step S1108 and the transporting of the film 102 is stopped. If the last film frame or the first film frame has not been arrived at then the flow of control returns to the step S1008, and the above described processing is repeated.

Figure 12:
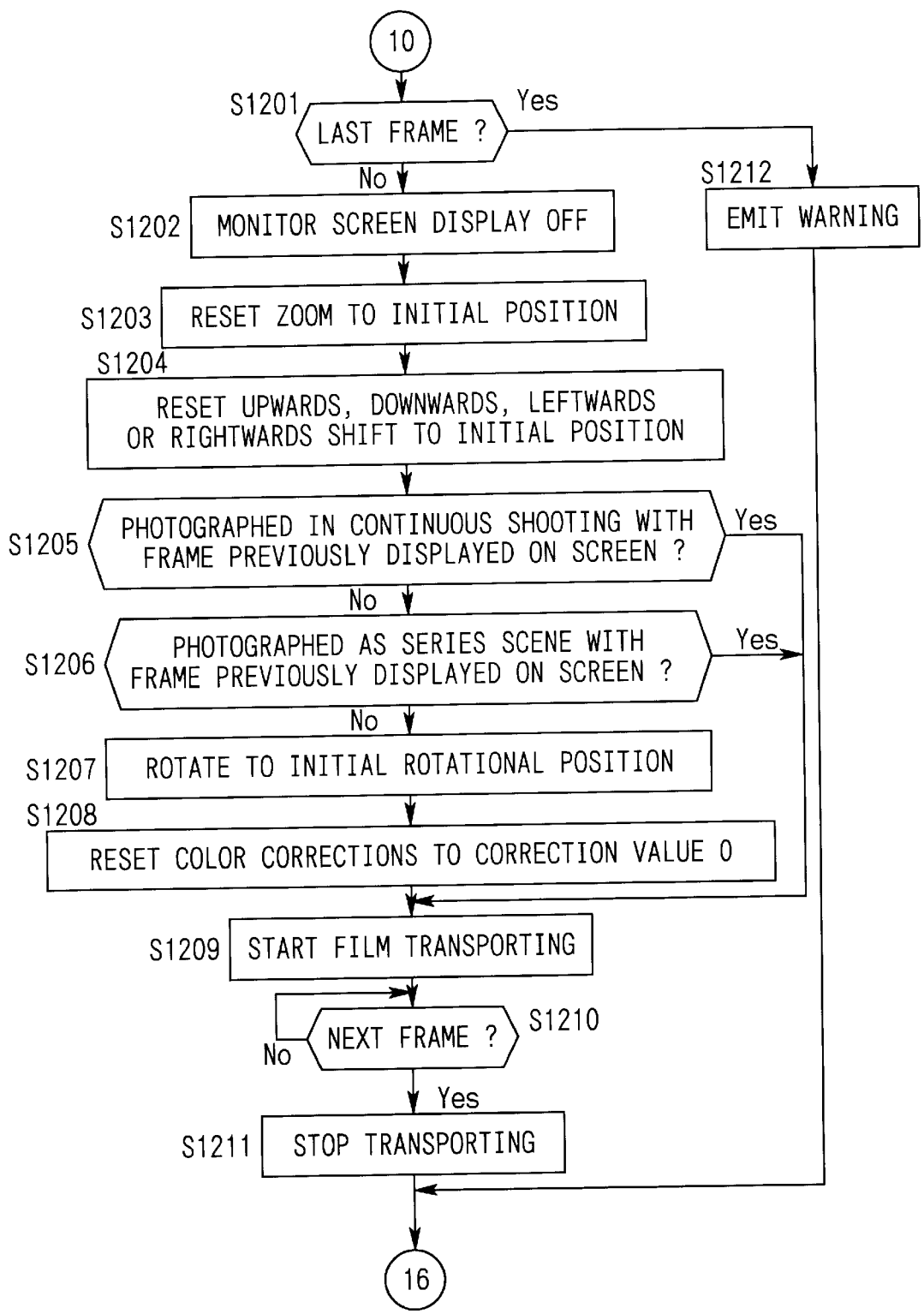
FIG. 12 continues on from FIG. 11, and is a flow chart showing the control program for film image display.

The single frame wind on procedure will be explained with reference to FIG. 12.

Figure 3:
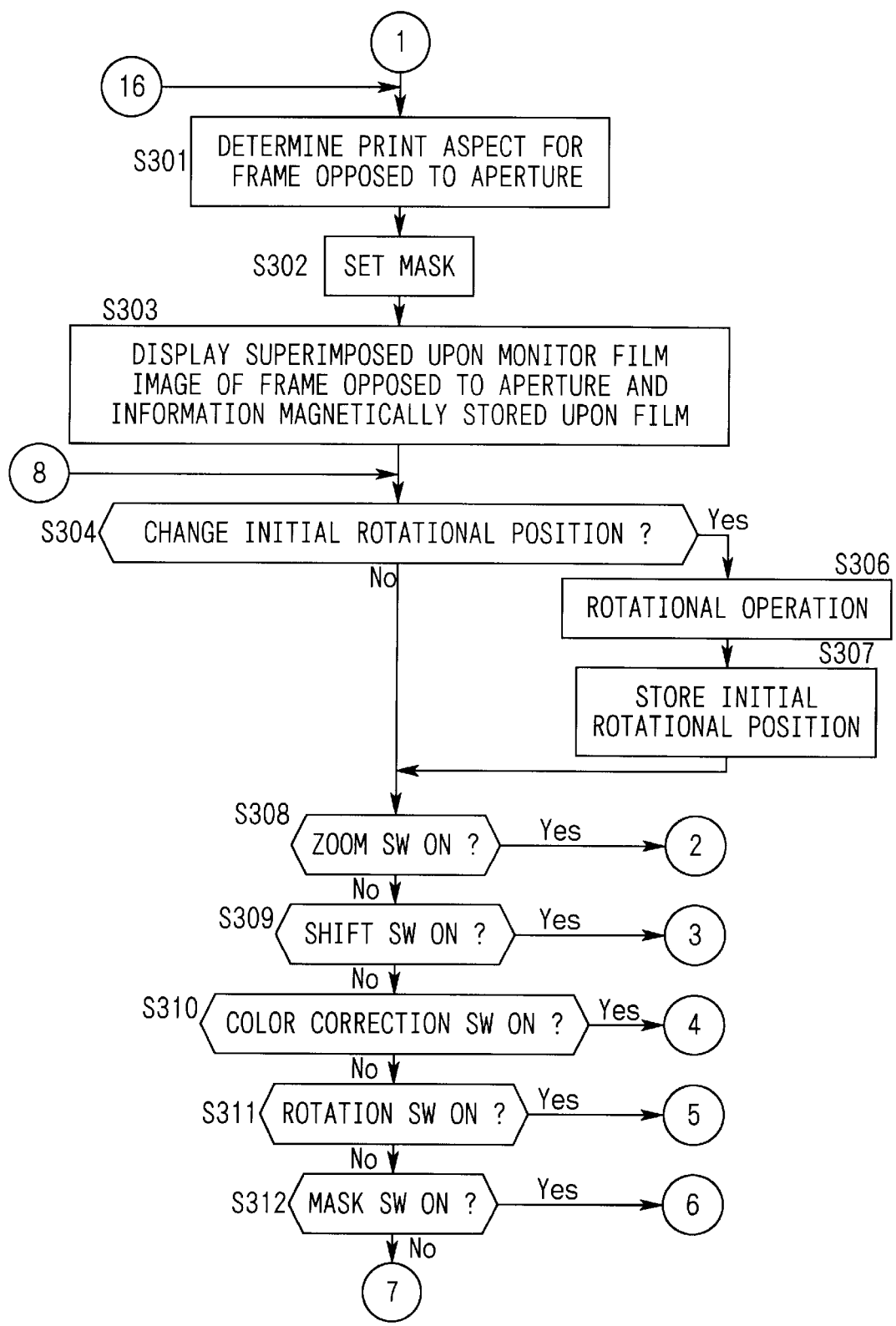
FIG. 3 continues on from FIG. 2, and is a flow chart showing the control program for film image display.
Figure 4:
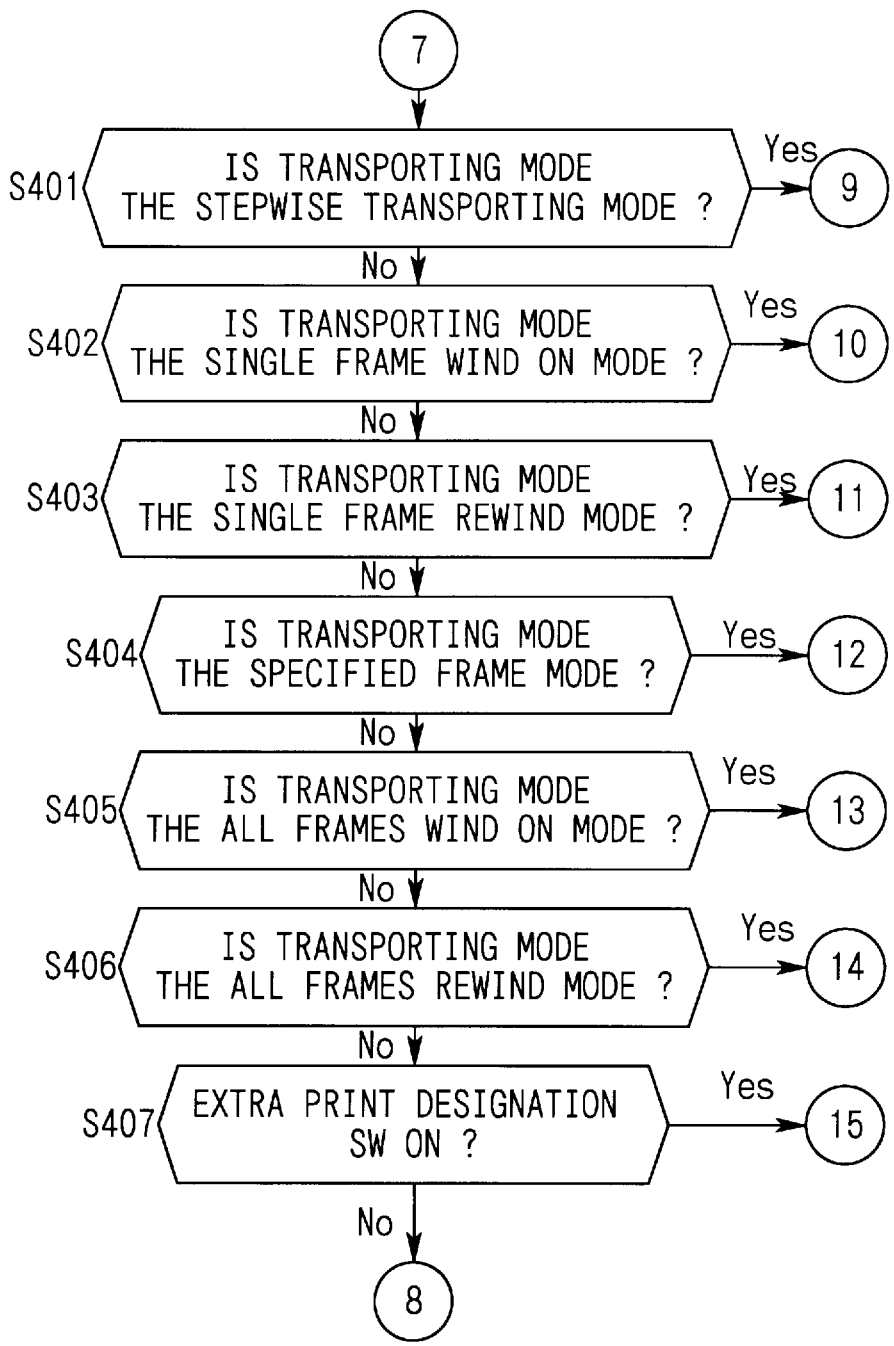
FIG. 4 continues on from FIG. 3, and is a flow chart showing the control program for film image display.

In a step S1201 it is checked whether or not the film frame which currently is opposed to the aperture is the last film frame, and if it is the last film frame the flow of control proceeds to a step S1212 and a warning is displayed upon the monitor, and the flow of control returns to the step S301 of FIG. 3.

If it is not the last film frame, then in a step S1202, along with stopping the display of the film image which is currently being displayed upon the monitor screen, the superimposed display of the information such as date/time, film frame number, and the like is stopped. In a step S1203, the photographic lens 113 is zoomed so as to be reset to its initial position, and in a step S1204 the CCD camera 114 is driven so as to be shifted, and is reset back to its previous initial position.

In a step S1205, it is decided whether or not the film frame which is currently opposed to the aperture and the next film frame which is to be opposed to the aperture are film frames which were shot with continuous shooting, based upon the magnetic recorded information or the optical recorded information upon the film 102. In the case of continuous shooting film frames, the flow of control proceeds to a step S1209. If these are not continuous shooting film frames, then in a step S1206 it is decided whether or not the film frame which is currently opposed to the aperture and the next film frame which is to be opposed to the aperture are series film frames which were photographed with the same scene, based upon the magnetic recorded information upon the film 102. If they are series film frames which were photographed with the same scene, then the flow of control proceeds to the step S1209, while otherwise the flow of control proceeds to a step S1207. In the step S1207 the CCD camera 114 is rotated to its initial rotational position, and next in a step S1208 all of the color correction amounts are reset to zero.

On the other hand, if the film frame in the display and the next film frame are film frames which were photographed in the continuous shooting mode or are series film frames which were photographed with the same scene, then these film frames are displayed under the identical display conditions, without changing the rotational position and the color correction amount of the film image.

In the step S1209, the transporting of the film 102 is started. In a step S1210 the film 102 is transported until the next film frame opposes the aperture, and in a step S1211 the transporting of the film is stopped.

Next, the single frame rewind procedure will be explained with reference to FIG. 13.

In a step S1301 it is checked whether or not the film frame which currently is opposed to the aperture is the first film frame, and if it is the first film frame the flow of control proceeds to a step S1312 and a warning is displayed upon the monitor, and the flow of control returns to the step S301 of FIG. 3.

If it is not the last film frame, then in a step S1302, along with stopping the display of the film image which is currently being displayed upon the monitor screen, the superimposed display of the information such as date/time, film frame number, and the like is stopped. In a step S1303, the photographic lens 113 is zoomed so as to be reset to its initial position, and in a step S1304 the CCD camera 114 is driven so as to be shifted, and is reset back to its previous initial position.

In a step S1305, it is decided whether or not the film frame which is currently opposed to the aperture and the next film frame which is to be opposed to the aperture are film frames which were shot with continuous shooting, based upon the magnetic recorded information or the optical recorded information upon the film 102. In the case of continuous shooting film frames, the flow of control proceeds to a step S1309. If these are not continuous shooting film frames, then in a step S1306 it is decided whether or not the film frame which is currently opposed to the aperture and the next film frame which is to be opposed to the aperture are series film frames which were photographed with the same scene, based upon the magnetic recorded information or the optically recorded information upon the film 102. If they are series film frames which were photographed with the same scene, then the flow of control proceeds to the step S1309, while otherwise the flow of control proceeds to a step S1307. In the step S1307 the CCD camera 114 is rotated to its initial rotational position, and next in a step S1308 all of the color correction amounts are reset to zero.

On the other hand, if the film frame in the display and the next film frame are film frames which were photographed in the continuous shooting mode or are series film frames which were photographed with the same scene, then these film frames are displayed under the identical display conditions, without changing the rotational position and the color correction amount of the film image.

In the step S1309, the transporting of the film 102 is started. In a step S1310 the film 102 is transported until the next film frame opposes the aperture, and in a step S1311 the transporting of the film is stopped.

Figure 14:
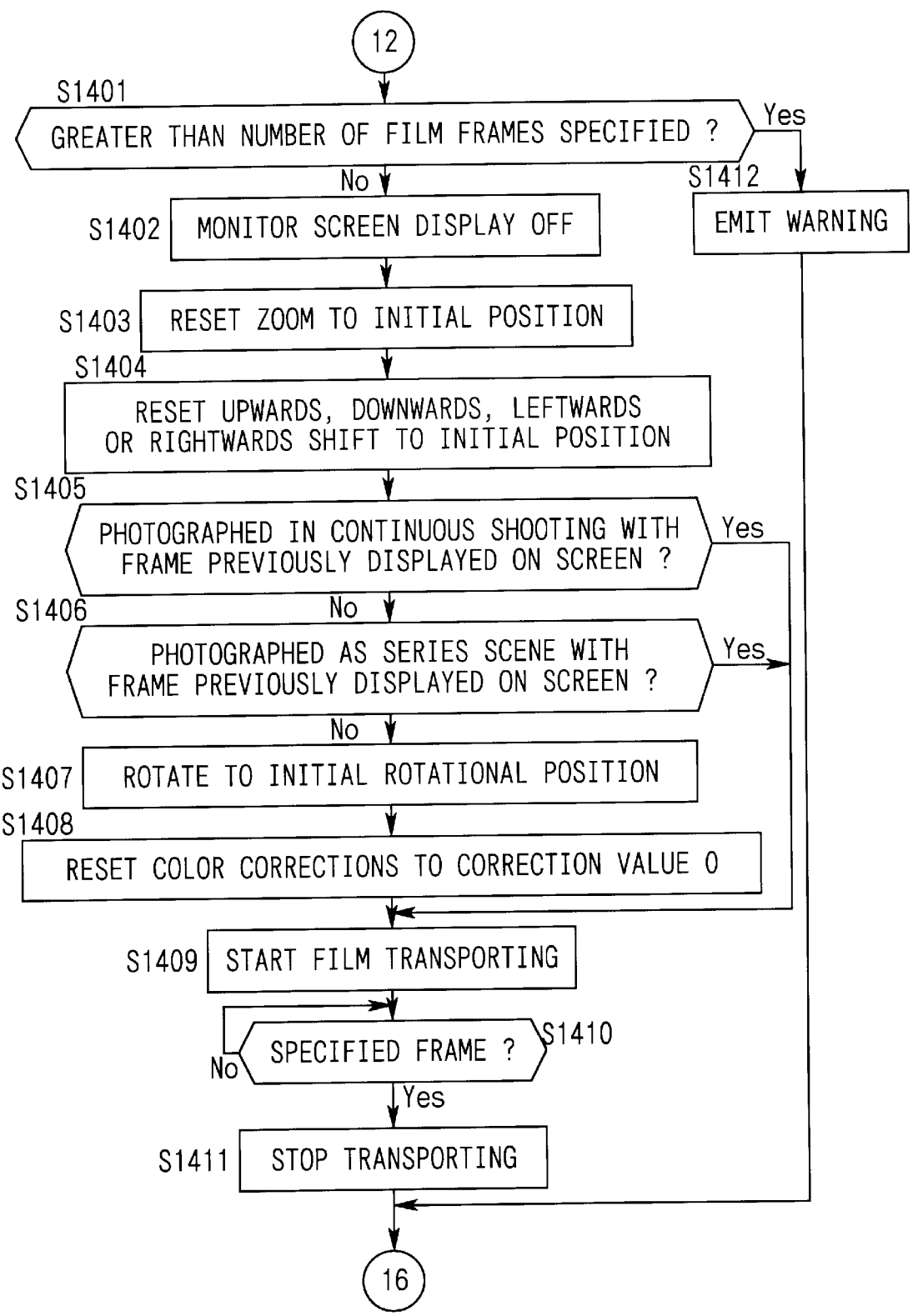
FIG. 14 continues on from FIG. 13, and is a flow chart showing the control program for film image display.

The processing for the specified film frame transporting mode will be explained with reference to FIG. 14.

In a step S1401 it is checked whether or not a film frame may have been specified which is greater than the number of film frames which can be shot upon the film 102, and if a film frame has been specified which is greater than the number of film frames which can be shot then the flow of control proceeds to a step S1412 and a warning is displayed upon the monitor, and the flow of control returns to the step S301 of FIG. 3.

If there is no problem with the specified film frame then the flow of control proceeds to a step S1402 and, along with stopping the display of the film image which is currently being displayed upon the monitor screen, the superimposed display of the information such as date/time, film frame number, and the like is stopped. In a step S1403, the photographic lens 113 is zoomed so as to be reset to its initial position, and in a step S1404 the CCD camera 114 is driven so as to be shifted, and is reset back to its previous initial position.

In a step S1405, it is decided whether or not the film frame which is currently opposed to the aperture and the next film frame which is to be opposed to the aperture are film frames which were shot with continuous shooting, based upon the magnetic recorded information or the optical recorded information upon the film 102. In the case of continuous shooting film frames, the flow of control proceeds to a step S1409. If these are not continuous shooting film frames, then in a step S1406 it is decided whether or not the film frame which is currently opposed to the aperture and the next film frame which is to be opposed to the aperture are series film frames which were photographed with the same scene, based upon the magnetic recorded information or the optically recorded information upon the film 102. If they are series film frames which were photographed with the same scene, then the flow of control proceeds to the step S1409, while otherwise the flow of control proceeds to a step S1407. In the step S1407 the CCD camera 114 is rotated to its initial rotational position, and next in a step S1408 all of the color correction amounts are reset to zero.

On the other hand, if the film frame in the display and the next film frame are film frames which were photographed in the continuous shooting mode or are series film frames which were photographed with the same scene, then these film frames are displayed under the identical display conditions, without changing the rotational position and the color correction amount of the film image.

In the step S1409, the transporting of the film 102 is started. In a step S1410 the film is transported until the next film frame opposes the aperture, and in a step S1411 the transporting of the film is stopped.

Next, the all film frames wind on procedure will be explained with reference to FIG. 15.

In a step S1501 it is checked whether or not the film frame which currently is opposed to the aperture is the last film frame, and in the case of the last film frame, since no further winding on of the film can be performed, in a step S1511 the fact that it is the last film frame is displayed, and the flow of control returns to the step S301 of FIG. 3.

If it is not the last film frame, then in a step S1502, along with stopping the display of the film image which is currently being displayed upon the monitor screen, the superimposed display of the information such as date/time, film frame number, and the like is stopped. In a step S1503, the photographic lens 113 is zoomed so as to be reset to its initial position, and in a step S1504 the CCD camera 114 is driven so as to be shifted, and is reset back to its previous initial position. In a step S1505 the CCD camera 114 is rotated to its initial rotational position, and next in a step S1506 all of the color correction amounts are reset to zero.

In a step S1507 the transporting of the film 102 is started, and in a step S1508 a symbol which shows that the film is being transported, and the film frame number during transporting and the like, are displayed as superimposed. In steps S1509 and S1510 the transporting is stopped when the film 102 has been transported as far as the last film frame.

Before displaying the next photographed film frame upon the monitor, the zoom position of the photographic lens 113, the rotational position of the CCD camera 114 and its upward, downward, leftward, and rightward shift position, and the color correction amount are reset, and are returned to their respective initially set values.

If the film frame in the display and the next film frame are continuous shooting film frames or are series film frames which were photographed with the same scene, then the next film frame is displayed in the same state, without resetting the rotational position of the CCD camera 114 and the color correction amount.

Since the zoom position of the photographic lens 113, the rotational position of the CCD camera 114 and its upward, downward, leftward, and rightward shift position, and the color correction amount basically are set individually for each film frame, it is desirable for them all to be reset before displaying the image of the next film frame.

However, in the case of continuous shooting film frames or series film frames, the probability of the upwards and downwards directions of the images being the same is high, and also it is desirable for the color corrections to be influenced to be the same. For example, in the case of continuous shooting in the vertical position, if the rotational position is returned while displaying the next film frame, then it is necessary for the user to designate the rotation each time. Also the same is the case with regard to the color correction: in the case of continuous shooting, the probability that the object which is being photographed is the same is high, and it is desirable to go on using the same correction.

Figure 16:
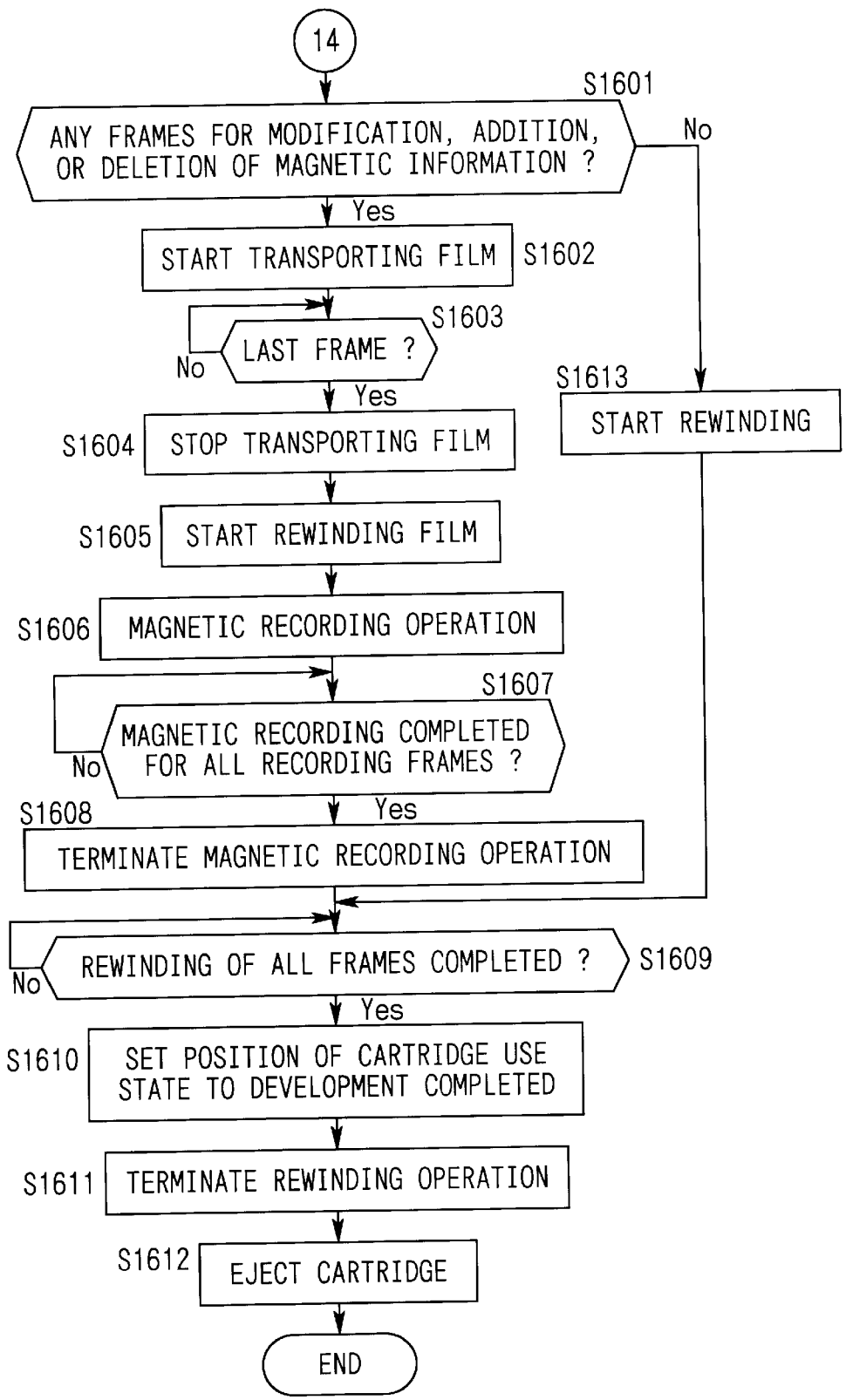
FIG. 16 continues on from FIG. 15, and is a flow chart showing the control program for film image display.

Next, the all film frames rewind procedure will be explained with reference to FIG. 16.

In a step S1601 a check is made as to whether or not there are any film frames for which the magnetically recorded information should be modified, added to, or deleted, and if there are such film frames then in steps S1602 through S1608 these procedures are performed, while if there are none then the flow of control is transferred to a step S1613 and the rewinding of the film 102 is started. It should be noted that the magnetically recorded information to be modified or to be added includes designation of extra prints or designation of change of print aspect ratio. Further, it would also be acceptable that the magnetically recorded information is added by providing the function of inputting the date/time onto a film which was shot on a camera which was not endowed with any recording function for photographic date/time, or inputting a title for the film.

If modification, addition, or deletion of the magnetically recorded information is to be performed, then, after having temporarily transported the film 102 to its last film frame in steps S1602 through S1604, in a step S1605 it is started to be rewound again. In a step S1606, while the film 102 is being rewound, recording is performed upon the magnetic recording portion of each photographic film frame for designation of the number of extra prints, print aspect ratio, modification of the magnetically recorded information or the like. In steps S1607 and S1608, the magnetic recording action is terminated if the modification, addition, or deletion of the magnetically recorded information for all of the film frames has been completed.

In the step S1609, if the rewinding of all of the film frames has been completed, the flow of control proceeds to the step S1610, and a use state display mechanism (not shown in the figures) of the cartridge 101 is set to development completed. In a step S1611 the driving of the rewinding motor 105 is stopped and the rewinding operation is terminated. Next in a step S1612 the cartridge 101 is ejected, and the rewinding of all of the film frames is completed.

It should be noted that it has been shown by way of example that in this embodiment the modification, addition, or deletion of the magnetically recorded information is performed at one time during rewinding, but it would also be acceptable to perform the modification, addition, or deletion of the magnetically recorded information for each film frame when the information is changed.

Next, the extra print designation procedure will be explained with reference to FIG. 17.

When an extra print designation switch for ordering extra prints is operated, the extra print designation procedure is executed.

If the extra printing has been designated when display is being performed with the display conditions for the film image having been changed from the initial conditions, a warning is emitted and all of the display conditions are returned to the initial conditions. In other words, if extra printing has been designated while the photographic lens 113 is in the zoomed state, the CCD camera 114 is in the upwards, downwards, leftwards, or rightwards shifted state, the CCD camera 114 is in the rotated state, color correction has been performed, or the print aspect ratio is in the set state, a warning is issued and all of these settings are returned to their initial states. Since, even if upon the monitor screen zooming, shifting in the upwards, downwards, leftwards, or rightwards directions, rotation, or color correction has been performed, it is not possible for these alterations to affect the prints, accordingly the image upon the monitor when printing is designated and the actually printed image become different.

Therefore, if extra prints have been designated in the state in which zooming, shifting in the upwards, downwards, leftwards, or rightwards directions, rotation, or color correction have been changed from the initial state, a warning is emitted and the image which is actually printed is displayed upon the monitor, so that attention is necessarily aroused. After this, it is necessary to check whether or not designation of extra printing should be performed newly again.

In this connection, it is considered that in some cases it may be desired to see the image in the state of the display conditions which were set before returning to the initial state, after returning to the initial state. In such a case, the user must store the previous display conditions and perform control in order to return the display conditions. Accordingly, a function of once returning to the original settings becomes necessary.

It should be noted that changes are possible with regard to the print aspect ratio, and new settings are accepted. By providing the function of changing the print aspect ratio, it becomes possible to obtain prints of an aspect ratio different from that of the images which were photographed with the camera.

In a step S1701 a check is made as to whether or not the photographic lens 113 is still zoomed, and if it is still zoomed then the flow of control proceeds to a step S1702 and a warning is emitted, and next in a step S1703 it is reset to the initial zoom position. In a step S1704 a check is made as to whether or not the photographic lens 113 is still shifted upwards, downwards, leftwards, or rightwards, and if it is still shifted then the flow of control proceeds to a step S1705 and a warning is issued, and next in a step S1706 the shift amount upwards, downwards, leftwards, or rightwards is reset to the zero position. In a step S1707, a check is made as to whether or not the CCD camera 114 is still rotated, and if it is still rotated then the flow of control proceeds to a step S1708 and a warning is emitted, and next in a step S1709 it is reset to the initial rotational position.

In a step S1710, a check is made as to whether or not the color correction is still being performed, and if it is still being performed then the flow of control proceeds to a step S1711 and a warning is emitted, and next in a step S1712 it is reset to the color correction amount zero. In a step S1713, a check is made as to whether or not the print aspect ratio which was read in from the magnetic recorded information or the optical recorded information, and the aspect ratio of the mask of the image which is being displayed upon the monitor, are different; and, if the mask has been changed so that the print aspect ratio and the mask aspect ratio are different, then the flow of control proceeds to a step S1714 and a warning is emitted. And in a step S1715 a mask is displayed as superimposed, so as to bring the print aspect ratio read in from the magnetic recorded information or the optical recorded information, and the mask aspect ratio of the image displayed upon the monitor, to be the same.

In this way, if the designation of extra prints is performed in the state in which the zooming, the shifting upwards, downwards, leftwards or rightwards, the color correction, or the print aspect ratio has been changed from the initially set value, then a warning is issued and the initially set value is returned to, and an image as initially set is displayed upon the monitor. In this state, in a step S1723 a check is made as to whether or not extra printing is requested anew by the extra print designation switch. If the extra print designation switch is being operated then the flow of control proceeds to a step S1716, while if not the flow of control proceeds to a step S1720.

With regard to the print aspect ratio, a change is possible, so in a step S1716 a check is made as to whether or not the print aspect ratio which was read in from the magnetic recorded information or the optical recorded information is to be changed. If a changing operation for the print aspect ratio is being performed via the change switch the flow of control is transferred to a step S1717, and the print aspect ratio which is to be changed to is input. And in a step S1717A the film image is displayed with the print aspect ratio which was changed to. In a step S1718 the number of extra prints is input, and next in a step S1719 the number of extra prints, the film frame number, and the print aspect ratio are stored in the memory 124. These items of information were read out from the memory 124 and are recorded in the magnetic recording portion for each film frame, during the process of rewinding all the film frames shown in FIG. 16.

In a step S1720 a check is made as to whether or not the zooming, the leftwards, rightwards, upwards or downwards shifting, the rotation, and the color correction have been set to their initial states along with the designation of extra prints, and if they have been set to their initial states then in a step S1721 it is checked whether or not they are to be returned to their previous display states from their initial states. If they are to be returned to their previous display states, then in a step S1722 the zooming, the leftwards, rightwards, upwards or downwards shifting, the rotation, the color correction and the print aspect ratio are returned to their previous settings.

Figure 18:
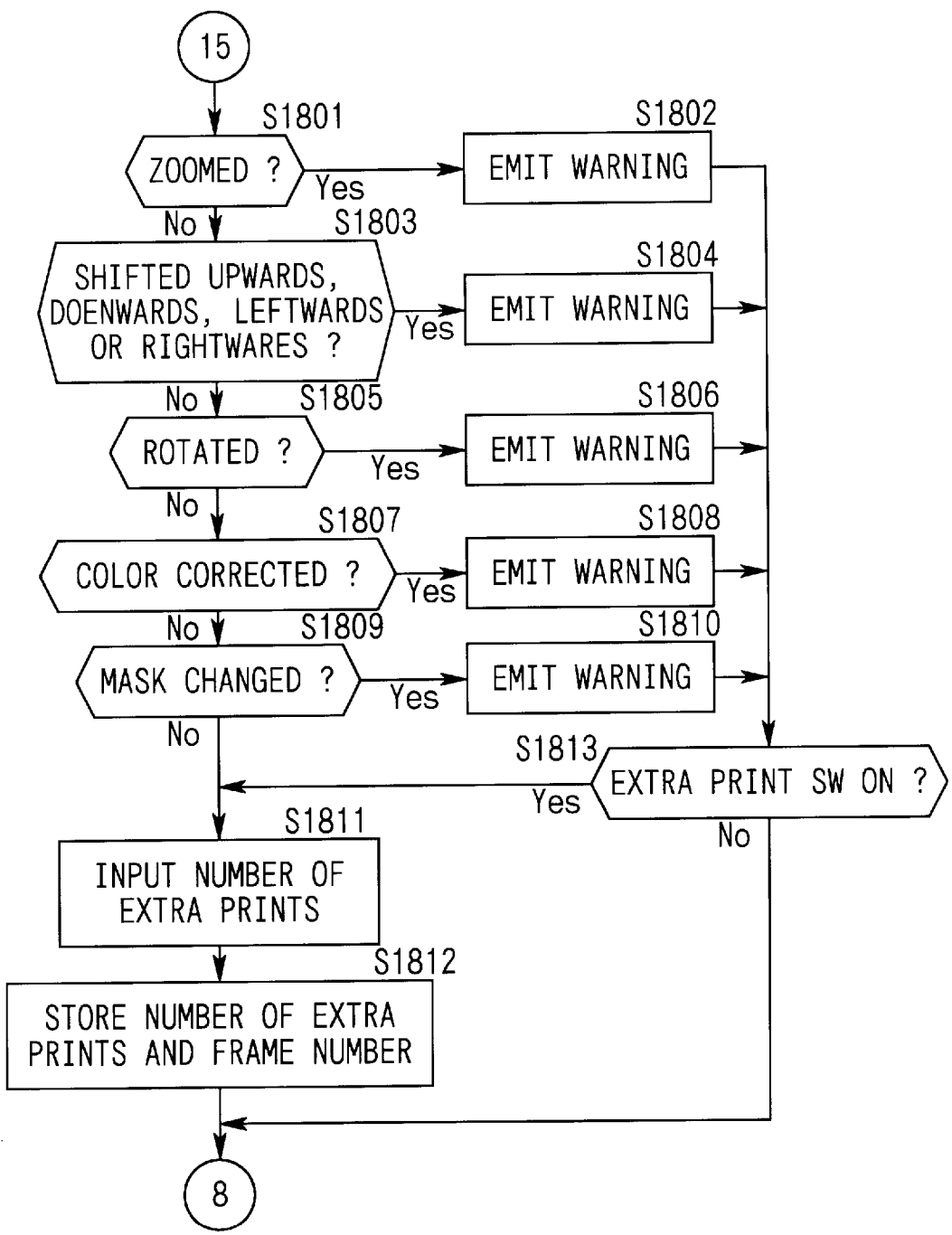
FIG. 18 is a flow chart showing a variant example of the control program for film image display.

FIG. 18 shows a variant example of the extra print designation procedure.

In the embodiment described above it was shown by way of example that the zooming of the photographic lens 113 and the shifting and rotation of the CCD camera 114 were performed automatically by means of motors; but, if these are performed by manual operation, even if the user changes them from their initial values to any set values, they cannot be automatically returned to their initially set values.

Thus it is so arranged that, in the event that extra prints have been designated with the zooming state, the upwards, downwards, leftward or rightwards shift state, the rotation state, the color correction state, or the print aspect ratio in the set state, warning is emitted and the extra print designation is not accepted.

It should be noted that the extra print designation is accepted if the extra print switch has been operated after the warning, thus having acknowledged that extra prints are being ordered with a different image from a monitor image.

When the extra print designation switch is operated in order to order extra prints, the extra print designation procedure of this variant example is executed.

In a step S1801 a check is made as to whether or not the photographic lens 113 is still zoomed, and if it is still zoomed then the flow of control proceeds to a step S1802 and a warning is emitted. In a step S1803 a check is made as to whether or not the photographic lens 113 is still shifted upwards, downwards, leftwards, or rightwards, and if it is still shifted then the flow of control proceeds to a step S1804 and a warning is issued. In a step S1805, a check is made as to whether or not the CCD camera 114 is still rotated, and if it is still rotated then the flow of control proceeds to a step S1806 and a warning is emitted.

In a step S1807 a check is made as to whether or not the color correction is still being performed, and if it is still being performed then the flow of control proceeds to a step S1808 and a warning is emitted. In a step S1809, a check is made as to whether or not the print aspect ratio which was read in from the magnetic recorded information or the optical recorded information, and the aspect ratio of the mask of the image which is being displayed upon the monitor, are different; and, if the mask has been changed so that the print aspect ratio and the mask aspect ratio are different, then the flow of control proceeds to a step S1810 and a warning is emitted.

If the designation of extra prints is performed in the state in which the zooming, the shifting upwards, downwards, leftwards or rightwards, the color correction, or the print aspect ratio has been changed from the initially set value, then, after a warning has been issued, in a step S1813 a check is made as to whether or not extra printing is being requested anew by the extra print designation switch. If the extra print designation switch is being operated then the flow of control proceeds to a step S1811, while if not the flow of control returns to the step S304 of FIG. 3.

In the step S1811 the number of extra prints is input, and next in a step S1812 the number of extra prints, the film frame number, and the print aspect ratio are stored in the memory 124.

Figure 19:
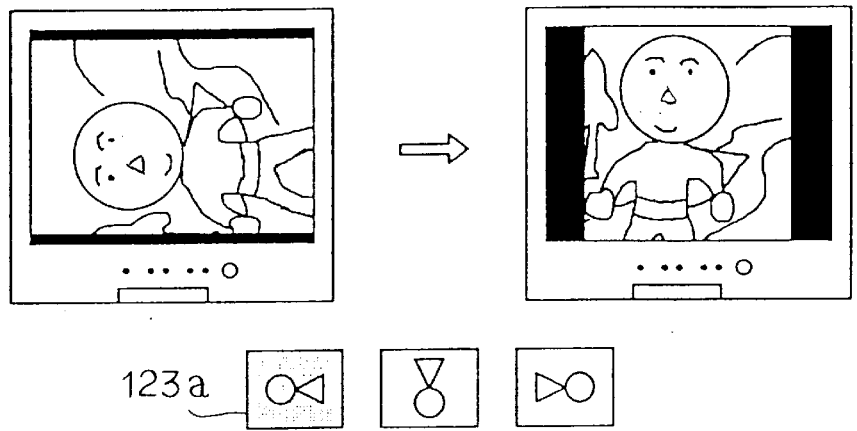
FIG. 19 is a figure for explanation of a method for designating film image rotation.
Figure 19:
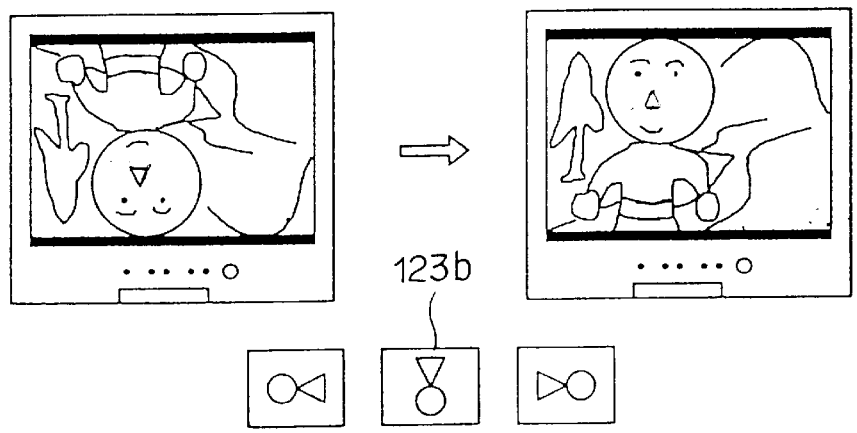
Figure 19:
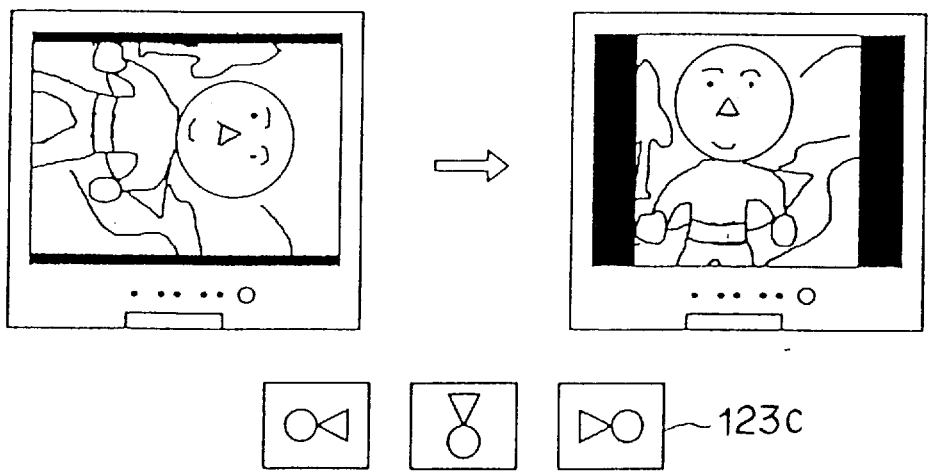

FIG. 19 shows a method for designation of the rotation of the CCD camera 114.

As shown in (a), if the upwards direction of the film image is displayed towards the left side of the monitor screen, a rotation switch of the same orientation as the monitor image, in other words a switch 123a with a pattern which is turned onto its left side, is operated, and the image is rotated in the correct direction.

Further, as shown in (b), if the upwards direction of the film image is displayed towards the bottom side of the monitor screen, then a switch of the same orientation as the monitor image, in other words a switch 123b with a pattern which is orientated downwards, is operated, and the image is rotated in the correct direction.

Yet further, as shown in (c), if the upwards direction of the film image is displayed towards the right side of the monitor screen, a rotation switch of the same orientation as the monitor image, in other words a switch 123c with a pattern which is turned onto its right side, is operated, and the image is rotated in the correct direction.

Figure 20C:
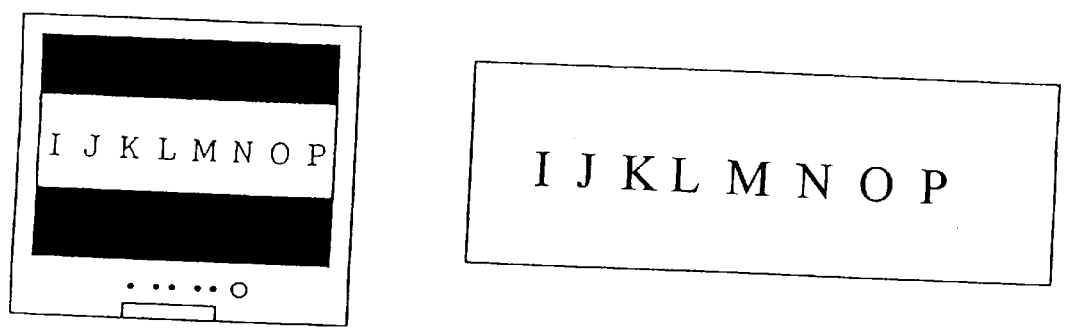
FIG. 20 is a figure showing print aspect ratio and the monitor screen.

FIG. 20 shows the print aspect and the mask for the monitor screen: the left side shows the image on the monitor screen, and the right side shows the print. (a) shows the image and the print in the case of an aspect ratio of 9 to 16, the so called Hi-Vision size. (b) shows the image and the print for the aspect ratio for current normal photographs. (c) shows the image and the print in the case of the aspect ratio for panorama photographs.

The switching over between (a) through (c) and the mask off state is performed using a changeover switch of the key 123. When ordering extra prints, it is possible to select any one from the print aspect ratios (a), (b), and (c). It should be noted that it would also be acceptable to arrange for printing to be performed in the Hi-Vision size (a), if the mask off state is selected when ordering extra prints.

Figure 21:
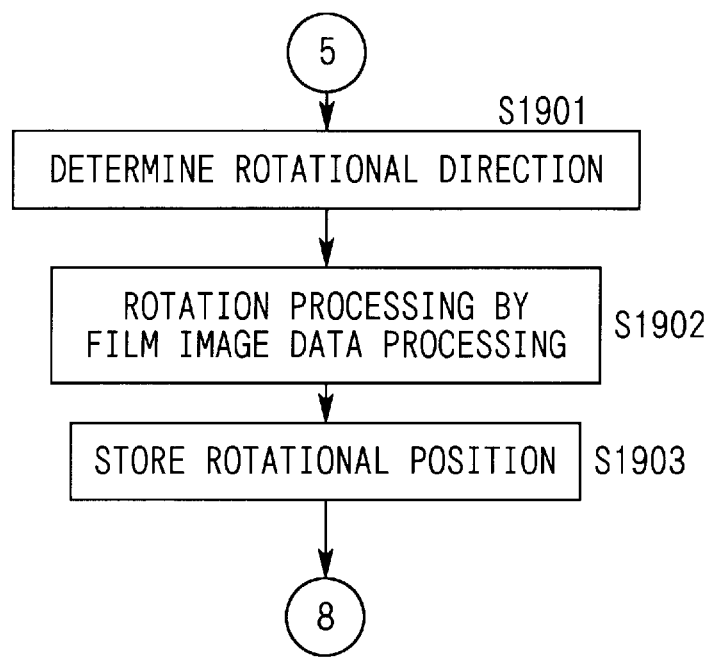
FIG. 21 is a flow chart showing a control program for film image display which may be substituted for FIG. 8.

It should be noted that, although in the above described embodiment the rotation of the film image was performed by physically rotating the CCD camera 114 by using the rotation and shifting control circuit 127 and a motor not shown in the figures, it would also be acceptable to endow the image control circuit 116 with the function of rotating the film image by image data processing. A rotation procedure for the film image by the image control circuit 116 using image data processing will be explained with reference to FIG. 21. FIG. 21 is a figure for substitution instead of FIG. 8. The other control procedures are the same as in the embodiment described above. In a step S1901, the rotational direction for the film image which is being displayed upon the monitor is determined via a rotation switch which has been operated. In a step S1902, the rotation processing for the film image is performed by the image control circuit 116 by image data processing. In a step S1904 the amount of rotation is stored in the memory 124, and the flow of control returns to the step S304 of FIG. 3. It should be noted that this image control circuit is executed in the same manner for the rotation of the film image which is also performed in the step S215 of FIG. 2 and in the step S306 of FIG. 3.

Further, although in the embodiment described above the explanation has been expressed in terms of the case in which a developed film is handled while in the state of being held in a cartridge, it can also be applied to the case of directly handling in the cut off state a unit consisting of a number of film frames from a developed film, or to the case of handling the same while it is held in a holder.

What is claimed is:

1. A film image signal outputting apparatus, comprising:
   an imaging section which forms an image of a developed film;
   a display condition setting section which sets a display condition for a film image which is displayed; and
   an image display signal output section which outputs a signal for displaying said image of the film which is formed by said imaging section, according to said display condition, wherein said display condition setting section cancels a display condition which was set for a film frame before outputting a signal to display an image of a next film frame.

2. A film image signal outputting apparatus according to claim 1, further comprising:

a continuous shooting film frame detection section which detects film frames which were photographed in a continuous shooting mode in which continuous shooting is performed while the film is being transported, based upon information recorded upon the film, and wherein said display condition setting section outputs a signal to display an image of the next film frame according to a display condition which is currently set, if it has been detected by said continuous shooting film frame detection section that a film frame corresponding to a signal which is currently being output by said image display signal output section and a film frame corresponding to a signal next to be output are film frames which were photographed in the continuous shooting mode.

3. A film image signal outputting apparatus according to claim 1, further comprising:

a series film frame detection section which detects film frames which were photographed with a same scene, based upon information recorded upon the film, and wherein said display condition setting section outputs a signal to display an image of the next film frame according to a display condition which is currently set, if it has been detected by said series film frame detection section that a film frame corresponding to a signal which is currently being output by said image display signal output section and a film frame corresponding to a signal next to be output are film frames which were been photographed with the same scene.

4. A film image signal outputting apparatus according to claim 1, wherein:

said display condition includes a condition of magnification and shrinkage of the film image.

5. A film image signal outputting apparatus according to claim 1, wherein:

said display condition includes a condition of shifting of the film image upwards, downwards, leftwards, and rightwards upon a display screen.

6. A film image signal outputting apparatus according to claim 1, wherein:

said display condition includes a condition of rotation of the film image upon a display screen.

7. A film image signal outputting apparatus according to claim 1, wherein:

said display condition include a condition of correcting color of the film image which is displayed.

8. A film image signal outputting apparatus, comprising:

an imaging section which forms an image of a developed film;

an image display signal output section which outputs a signal for displaying said image of the film which is imaged by said imaging section;

an image rotation section which rotates said film image which is displayed; and a storage section which stores a initial rotational position of said film image.

9. A film image signal outputting apparatus according to claim 8, wherein:

said image rotation section comprises a rotational drive section which physically rotationally drives said imaging section, and rotates said film image which is displayed by physically rotating said imaging section by said rotational drive section.

10. A film image signal outputting apparatus according to claim 8, wherein:

said image rotation section rotates said film image by data processing of image data of said image which is formed by said imaging section.

11. A film image signal outputting apparatus according to claim 8, further comprising:

an operation member for rotating the image through 90 degrees, 180 degrees or 270 degrees.

12. A film image signal outputting apparatus according to claim 8, further comprising:

a magnetically recorded information reading in device which reads in information magnetically recorded upon the film, and wherein said image rotation section sets said initial rotational position based upon the information read in by said magnetically recorded information reading in device.

13. A film image signal outputting apparatus according to claim 8, further comprising:

an optically recorded information reading in device which reads in information optically recorded upon the film, and wherein said image rotation section sets said initial rotational position based upon the information read in by said optically recorded information reading in device.

14. A film image signal outputting apparatus according to claim 12, wherein:

said information which is recorded upon said film is information related to an arrangement of a film cartridge chamber in a camera.

15. A film image signal outputting apparatus according to claim 13, wherein:

said information which is recorded upon said film is information related to an arrangement of a film cartridge chamber in a camera.

16. A film image signal outputting apparatus, comprising:

an imaging section which forms an image of a developed film;

a display condition setting section which sets a display condition for a film image which is displayed;

an image display signal output section which outputs a signal for displaying said image of the film which is formed by said imaging section according to said display condition;

a print designation input section for inputting a designation related to print; and a control section which, when said designation related to print is input by said print designation input section for a film frame for which a signal is being output for displaying according to the display condition which was set by said display condition setting section, emits a warning in a case that a display image according to said display condition and a print image disagree.

17. A film image signal outputting apparatus according to claim 16, further comprising:

a print designation recording section which records said designation relating to print for each film frame upon said film.

18. A film image signal outputting apparatus according to claim 16, wherein:

said print designation input section performs control so as not to accept said designation related to print, when said display image and said print image disagree.

19. A film image signal outputting apparatus according to claim 16, wherein:

said image display signal output section which, when a designation related to print is input for a film frame for which said display image according to said display condition and said print image disagree, outputs a signal which displays said film image under the same display condition as the print image of that film frame.

20. A film image signal outputting apparatus according to claim 16, wherein:

said display condition includes a condition of magnification and shrinkage of the film image.

21. A film image signal outputting apparatus according to claim 16, wherein:

said display condition includes a condition of shifting of the film image upwards, downwards, leftwards, and rightwards upon a display screen of said image display section.

22. A film image signal outputting apparatus according to claim 16, wherein:

said display condition includes a condition of rotation of the film image upon the display screen of said image display section.

23. A film image signal outputting apparatus according to claim 16, wherein:

said display condition include a condition of correcting color of the film image which is displayed upon said image display section.

24. A film image signal outputting apparatus according to claim 16, wherein:

said control section emits a warning when a print aspect ratio and an aspect ratio of the film image which is being displayed disagree.

25. A film image signal outputting apparatus according to claim 17, wherein:

said print designation recording section records said designation related to print upon said film magnetically.

26. A film image signal outputting apparatus, comprising:

an imaging section which forms an image of a developed film;

a display condition setting section which sets a display aspect ratio for a film image which is displayed;

an image display signal output section which outputs a signal for displaying said image of the film which is formed by said imaging section, according to said display condition;

a print designation input section for inputting a designation related to print; and an information recording section which, when said designation related to print is input while said display aspect ratio is set by said display condition setting section, along with recording said designation related to print upon said film, changes a print aspect ratio which is recorded upon said film to a value of the display aspect ratio which is set by said display condition setting section and records the changed print aspect ratio upon said film.

27. A film image signal outputting apparatus according to claim 26, wherein:

said information recording section records said designation related to print and said changed print aspect ratio upon said film magnetically.

* * * * *